US011414998B2

(12) United States Patent
Fujii et al.

(10) Patent No.: US 11,414,998 B2
(45) Date of Patent: Aug. 16, 2022

(54) TURBINE BLADE AND GAS TURBINE

(71) Applicant: Mitsubishi Hitachi Power Systems, Ltd., Kanagawa (JP)

(72) Inventors: Takashi Fujii, Yokohama (JP); Hidemichi Koyabu, Yokohama (JP); Shunsuke Torii, Yokohama (JP); Satoshi Hada, Yokohama (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 84 days.

(21) Appl. No.: 16/614,928

(22) PCT Filed: Apr. 17, 2018

(86) PCT No.: PCT/JP2018/015832
§ 371 (c)(1),
(2) Date: Nov. 19, 2019

(87) PCT Pub. No.: WO2019/003590
PCT Pub. Date: Jan. 3, 2019

(65) Prior Publication Data
US 2020/0190989 A1    Jun. 18, 2020

(30) Foreign Application Priority Data
Jun. 29, 2017  (JP) .............................. JP2017-126978

(51) Int. Cl.
*F01D 5/18*  (2006.01)
*F01D 9/02*  (2006.01)
(Continued)

(52) U.S. Cl.
CPC ............. *F01D 5/186* (2013.01); *F01D 5/188* (2013.01); *F01D 5/288* (2013.01); *F01D 9/02* (2013.01);
(Continued)

(58) Field of Classification Search
CPC .......... F01D 5/186; F01D 5/187; F01D 5/188; F01D 5/189; F05D 2260/201
See application file for complete search history.

(56) References Cited

U.S. PATENT DOCUMENTS 3,767,322 A * 10/1973 Durgin .................... F01D 9/042
                                                        416/97 R
5,100,293 A    3/1992 Anzai et al.
(Continued)

FOREIGN PATENT DOCUMENTS

EP    3 054 113    8/2016
JP    3-92504    4/1991
(Continued)

OTHER PUBLICATIONS

Zhiduo Wang, Dian Wang, Zhaofang Liu, Znenping Feng, Numerical analysis on effects or inlet pressure and temperature non-uniformities on aero-thermal performance of a HP turbine, Aug. 20, 2016, International Journal of Heat and Mass Transfer, 104 vol., pp. 83-97,https://www.sciencedirect.com/science/article/pii/S00179310153166907via%3Dihub#f0025 (Year: 2016).*

(Continued)

*Primary Examiner* — Christopher Verdier
*Assistant Examiner* — Michael K. Reitz
(74) *Attorney, Agent, or Firm* — Wenderoth, Lind & Ponack, L.L.P.

(57) ABSTRACT

A turbine blade includes an airfoil portion having a hollow portion extending along the blade height direction and film cooling holes arranged along the blade height direction, and an insert disposed in the hollow portion along the blade height direction and having impingement cooling holes. The insert includes a first high-density opening region having a higher density of the impingement cooling holes than in other surface regions of the insert. The geometric center of the first high-density opening region is positioned on the
(Continued)

suction side of the airfoil portion in the leading-edge-to-trailing-edge direction and on the outer side of the midpoint of the airfoil portion in the blade height direction. The film cooling holes includes upstream film cooling holes disposed in the suction surface of the airfoil portion at a position corresponding to the first high-density opening region or at a position closer to a leading edge than the position.

17 Claims, 12 Drawing Sheets

(51) Int. Cl.
  *F01D 5/28* (2006.01)
  *F02C 7/18* (2006.01)
(52) U.S. Cl.
  CPC ............ *F02C 7/18* (2013.01); *F05D 2240/81* (2013.01); *F05D 2260/201* (2013.01); *F05D 2260/202* (2013.01)

(56) References Cited

U.S. PATENT DOCUMENTS

| | | | |
|---|---|---|---|
| 5,207,556 | A | 5/1993 | Frederick et al. |
| 6,183,192 | B1 | 2/2001 | Tressler et al. |
| 6,506,013 | B1 | 1/2003 | Burdgick et al. |
| 2002/0090294 | A1* | 7/2002 | Keith ............ F01D 5/189 415/115 |
| 2008/0317585 | A1* | 12/2008 | Lee ............ F01D 5/189 415/115 |
| 2011/0123351 | A1 | 5/2011 | Hada et al. |
| 2012/0282110 | A1 | 11/2012 | Botrel et al. |
| 2015/0211376 | A1* | 7/2015 | Riley ............ F01D 5/186 415/115 |
| 2017/0101894 | A1* | 4/2017 | Preethi ............ F01D 25/12 |
| 2017/0130589 | A1 | 5/2017 | Cui et al. |
| 2018/0010483 | A1* | 1/2018 | Beach ............ F01D 5/188 |

FOREIGN PATENT DOCUMENTS

| | | |
|---|---|---|
| JP | 04-311604 | 11/1992 |
| JP | 6-10704 | 1/1994 |
| JP | 11-62504 | 3/1999 |
| JP | 11-159303 | 6/1999 |
| JP | 2000-282806 | 10/2000 |
| JP | 2001-207802 | 8/2001 |
| JP | 2001-317302 | 11/2001 |
| JP | 2003-083001 | 3/2003 |
| JP | 2007-239756 | 9/2007 |
| JP | 2011-208625 | 10/2011 |
| JP | 2013-516563 | 5/2013 |
| JP | 2017-89633 | 5/2017 |
| WO | 2010/131385 | 11/2010 |

OTHER PUBLICATIONS

Notice of Reasons for Refusal dated Apr. 20, 2021 in corresponding Japanese Application No. 2019-526175, with English-language translation.
International Search Report dated Jun. 19, 2018 in International (PCT) Application No. PCT/JP2018/015832 willi English translation.
International Preliminary Report on Patentablity and Written Opinion of the International Searching Authority dated Jan. 9, 2020 in International (PCT) Application No. PCT/JP2018/015832 with English translation.
Office Action dated Aug. 4, 2017 in corresponding JP Application No. 2017-126978 willi machine translation.
Office Action dated Dec. 22, 2017 in corresponding JP Application No. 2017-126978 with machine translation.

* cited by examiner

TURBINE BLADE AND GAS TURBINE

BACKGROUND OF THE INVENTION

1. Technical Field

The present disclosure relates to a turbine blade and a gas turbine.

2. Description of the Related Art

Cooling methods such as film cooling and impingement cooling are often used for a turbine blade of a gas turbine or the like.

For instance, JP H11-62504A discloses a turbine blade in which a turbine blade wall having multiple film cooling holes and an insert having multiple impingement holes are disposed at a distance from each other. In this turbine blade, the turbine blade outer wall is cooled by guiding cooling air from the inside of the turbine blade wall via the film cooling holes to the outer wall surface of the turbine blade wall and forming a film boundary layer of the cooling air that covers the outer wall surface. Further, in this turbine blade, the turbine blade wall is cooled from the inner side by jetting cooling air from the inside of the insert via the impingement holes to the inner wall surface of the turbine blade wall.

Further, JP 2000-282806A discloses a stator blade provided with an impingement sleeve (insert) having a plurality of impingement holes (impingement cooling holes) in a cavity inside the blade wall. In this stator blade, in order to selectively cool the midspan of the stator blade, the impingement holes are formed in a portion of the impingement sleeve corresponding to the midspan of the stator blade. Further, in this stator blade, in order to provide more cooling effect to the inner surface of a wall on the positive pressure side (pressure side) than on the negative pressure side (suction side), the impingement holes are formed in the impingement sleeve so that the opening density of the impingement holes is higher on a surface of the impingement sleeve corresponding to the pressure-side wall of the stator blade.

SUMMARY OF THE INVENTION

1. Problems to be Solved

Incidentally, in order to protect the blade surface of the turbine blade from heat of a hot gas, in addition to cooling using a coolant such as film cooling or impingement cooling described above, a thermal barrier coating is often applied to the blade surface of the turbine blade.

The thermal barrier coating may separate from the blade surface of the turbine blade upon impingement of the hot gas or particles in the gas during operation of the turbine. When the thermal barrier coating separates, the heat resistance of the turbine blade decreases at the separated portion, which can increase a risk of thermal damage to the turbine blade.

Therefore, it is desired to effectively cool the turbine blade so as to suppress thermal damage to the turbine blade, for instance, even when separation of the thermal barrier coating occurs.

In view of the above, an object of at least one embodiment of the present invention is to provide a turbine blade and a gas turbine including the same whereby it is possible to suppress thermal damage.

2. Solution to the Problems (1) A turbine blade according to at least one embodiment of the present invention comprises: an airfoil portion having a hollow portion extending along a blade height direction and a plurality of film cooling holes arranged along the blade height direction; and an insert disposed in the hollow portion along the blade height direction and having a plurality of impingement cooling holes. The insert includes a first high-density opening region having a higher density of the impingement cooling holes than in other surface regions of the insert. A geometric center of the first high-density opening region is positioned on a suction side of the airfoil portion in a leading-edge-to-trailing-edge direction. The geometric center of the first high-density opening region is positioned on an outer side of a midpoint of the airfoil portion in the blade height direction. The plurality of film cooling holes includes a plurality of upstream film cooling holes disposed in a suction surface of the airfoil portion at a position corresponding to the first high-density opening region or at a position closer to a leading edge than the position corresponding to the first high-density opening region.

Herein, the term "upstream film cooling hole" means a film cooling hole having the above-described positional relationship with the "first high-density opening region" and does not require the presence of a film cooling hole downstream of the "upstream film cooling hole".

With the above configuration (1), since the insert has the first high-density opening region having a higher density of the impingement cooling holes than in the other regions, it is possible to effectively cool the inner wall surface of the airfoil portion by the impingement cooling effect using a coolant at the position corresponding to the first high-density opening region. Additionally, with the above configuration (1), since the upstream film cooling holes are disposed in the suction surface of the airfoil portion at the position corresponding to the first high-density opening region or at the position closer to the leading edge than this position is to the leading edge, heat input from the hot combustion gas to the suction surface of the airfoil portion is suppressed by a film boundary layer formed so as to cover the first high-density opening region. Thus, it is possible to improve the film cooling effect on the suction surface of the airfoil portion at the position corresponding to the first high-density opening region.

Further, since the geometric center of the first high-density opening region of the impingement cooling holes is disposed on a more outer side than the outer position of the airfoil portion in the blade height direction, it is possible to effectively suppress thermal damage at the outer position of the airfoil portion in the blade height direction where separation of a thermal barrier coating is likely to occur.

(2) In some embodiments, in the above configuration (1), an upstream film cooling hole array formed by the plurality of upstream film cooling holes is formed over a blade height range including at least the first high-density opening region.

With the above configuration (2), since the upstream film cooling hole array is formed over a blade height range including at least the first high-density opening region of the impingement cooling holes, it is possible to suppress heat input from the combustion gas side and effectively cool the airfoil portion at the position corresponding to the first high-density opening region by a film boundary layer of a coolant formed by the upstream film cooling holes.

(3) In some embodiments, in the above configuration (2), the geometric center of the first high-density opening region is positioned closer to a trailing edge than the upstream film cooling hole array in the leading-edge-to-trailing-edge direction.

With the above configuration (3), since the geometric center of the first high-density opening region having a higher density of the impingement cooling holes than in the other regions of the airfoil portion is positioned closer to the trailing edge than the upstream film cooling hole array is to the trailing edge, the impingement cooling effect by the impingement cooling holes and the film cooling effect by the upstream film cooling holes act cumulatively in a wide range of the first high-density opening region. Thus, it is possible to further improve the cooling effect in the first high-density opening region.

(4) In some embodiments, in any one of the above configurations (1) to (3), the first high-density opening region includes: a second high-density opening region formed on a leading edge side with respect to the airfoil portion; and a third high-density opening region formed on a more trailing edge side with respect to the airfoil portion than the second high-density opening region, and an opening density of the second high-density opening region is higher than an opening density of the third high-density opening region.

A thermal barrier coating more easily separates from the blade surface of the airfoil portion on the leading edge side than on the trailing edge side. In this regard, with the above configuration (4), since the opening density of the second high-density opening region on the leading edge side is higher than the opening density of the third high-density opening region on the trailing edge side in the first high-density opening region, it is possible to effectively suppress thermal damage to the airfoil portion at a leading-edge-side position where separation of the thermal barrier coating is likely to occur.

(5) In some embodiments, in the above configuration (4), a range in which the second high-density opening region extends in the blade height direction of the airfoil portion is larger than a range in which the third high-density opening region extends in the blade height direction of the airfoil portion.

A coating more easily separates on the leading edge side than on the trailing edge side, and a higher heat load is applied to the leading edge side than to the trailing edge side of the blade surface of the airfoil portion. In this regard, with the configuration (5), since the range in which the second high-density opening region on the leading edge side extends in the blade height direction is larger than the range in which the third high-density opening region on the trailing edge side extends in the blade height direction, it is possible to effectively and widely suppress thermal damage to the airfoil portion on the leading edge side.

(6) In some embodiments, in the above configuration (4) or (5), the second high-density opening region includes: a fourth high-density opening region formed on an outer side in the blade height direction of the airfoil portion; and a fifth high-density opening region formed on an inner side in the blade height direction, and an opening density of the fourth high-density opening region is higher than an opening density of the fifth high-density opening region.

With the above configuration (6), since the opening density of the fourth high-density opening region formed on the outer side in the blade height direction is higher than the opening density of the fifth high-density opening region formed on the inner side in the blade height direction in the second high-density opening region, it is possible to further enhance the cooling in the outer region with respect to the blade height direction on the leading edge side where a higher heat load is applied and separation of coating is likely to occur. Thus, it is possible to suppress thermal damage to the airfoil portion on the leading edge side.

(7) In some embodiments, in the above configuration (6), the opening density of the fifth high-density opening region is higher than the opening density of the third high-density opening region.

With the above configuration (7), since the opening density of the fifth high-density opening region on the inner side in the blade height direction on the leading edge side is higher than the opening density of the third high-density opening region on the trailing edge side, it is possible to enhance the cooling on the leading edge side with a higher heat load widely from the outer side to the inner side in the blade height direction, compared with the blade surface on the trailing edge side.

(8) In some embodiments, in any one of the above configurations (4) to (7), the upstream film cooling holes are disposed between the second high-density opening region and the third high-density opening region in the leading-edge-to-trailing-edge direction.

With the above configuration (8), since the upstream film cooling holes are disposed between the second high-density opening region on the leading edge side and the third high-density opening region on the trailing edge side, more enhanced impingement cooling is applied to the second high-density opening region than to the third high-density opening region, while impingement cooling and film cooling are cumulatively applied to the third high-density opening region. Thus, it is possible to enhance the cooling in a wide range of the suction surface of the airfoil portion from the leading edge side to the trailing edge side.

(9) In some embodiments, in any one of the above configurations (1) to (8), the upstream film cooling holes includes: a plurality of first film cooling holes arranged along the blade height direction; and a plurality of second film cooling holes disposed closer to the leading edge than the plurality of first film cooling holes, and the plurality of first film cooling holes is disposed closer to a trailing edge than the plurality of second film cooling holes in the suction surface of the airfoil portion at the position corresponding to the first high-density opening region.

With the above configuration (9), since the first film cooling holes arranged along the blade height direction are disposed at a position corresponding to the first high-density opening region and closer to the trailing edge than the second film cooling holes is to the trailing edge, it is possible to further enhance the cooling of the first high-density opening region at a position closer to the trailing edge than the first film cooling holes by a film boundary layer of a coolant formed by the first film cooling holes, compared with the case where the first film cooling holes are not provided.

(10) In some embodiments, in the above configuration (9), the plurality of first film cooling holes is disposed between a position of the second film cooling holes and a trailing end of the first high-density opening region in the leading-edge-to-trailing-edge direction.

With the above configuration (10), since the first film cooling holes are disposed between the position of the second film cooling holes and the trailing end of the first high-density opening region, it is possible to further enhance the cooling of the first high-density opening region at the position closer to the trailing edge than the first film cooling holes by the overlapping effect of the first film cooling holes and the second film cooling holes.

(11) In some embodiments, in the above configuration (9) or (10), a first film cooling hole array formed by the plurality of first film cooling holes is formed over a blade height range including at least the first high-density opening region.

With the above configuration (11), since the first film cooling hole array is formed over a blade height range including at least the first high-density opening region, it is possible to suppress heat input from the combustion gas side and effectively cool the airfoil portion at the position corresponding to the first high-density opening region by a film boundary layer of a coolant formed by the first film cooling holes and the second film cooling holes.

(12) In some embodiments, in any one of the above configurations (9) to (11), a second film cooling hole array formed by the plurality of second film cooling holes is formed over a blade height range including at least a first film cooling hole array formed by the plurality of first film cooling holes.

With the above configuration (12), since the second film cooling hole array is formed over a blade height range including at least the first film cooling hole array, it is possible to more effectively cool the airfoil portion at the position corresponding to the first high-density opening region by a film boundary layer of a coolant formed by the first film cooling holes and the second film cooling holes.

(13) In some embodiments, in any one of the above configurations (9) to (12), the airfoil portion has a plurality of third film cooling holes arranged along the blade height direction, and the plurality of third film cooling holes is disposed closer to the trailing edge of the airfoil portion than the plurality of first film cooling holes in the suction surface of the airfoil portion.

With the above configuration (13), since the third film cooling holes are disposed closer to the trailing edge of the airfoil portion than the first film cooling holes is to the trailing edge, it is possible to more effectively cool a portion closer to the trailing edge of the airfoil portion than the first film cooling holes. Thus, with the above configuration (13), it is possible to more effectively suppress thermal damage to the airfoil portion.

(14) In some embodiments, in the above configuration (13), the plurality of second film cooling holes arranged along the blade height direction is formed closer to the leading edge than the plurality of first film cooling holes in the suction surface of the airfoil portion, and on the suction surface of the airfoil portion, a distance $L_{12}$ satisfies $0.3L_{23} \leq L_{12} \leq 0.5L_{23}$, where $L_{23}$ is a distance between a second film cooling hole array formed by the plurality of second film cooling holes and a third film cooling hole array formed by the plurality of third film cooling holes, and $L_{12}$ is a distance between a first film cooling hole array formed by the plurality of first film cooling holes and the second film cooling hole array.

With the above configuration (14), since $0.3L_{23} \leq L_{12}$ is satisfied, the first film cooling hole array is disposed on the trailing edge side where the pressure in the combustion gas passage is relatively low. Thus, it is possible to easily ensure the differential pressure across the impingement cooling holes. Further, with the above configuration (14), since $L_{12} \leq 0.5L_{23}$ is satisfied, the first film cooling hole array is disposed relatively close to the leading edge. Thus, it is possible to suppress heat input from the combustion gas side in a relatively wide region between the leading edge and the trailing edge by a film boundary layer formed by the first film cooling holes. Thus, with the above configuration (14), it is possible to effectively suppress thermal damage to the airfoil portion at the position corresponding to the first high-density opening region of the insert.

(15) In some embodiments, in any one of the above configurations (9) to (14), on the suction surface of the airfoil portion, a distance $L_1^*$ satisfies $0.3L^* \leq L_1^* \leq 0.7L^*$, where $L^*$ is a distance between a leading end and a trailing end of the first high-density opening region, and $L_1^*$ is a distance between the leading end of the first high-density opening region and a first film cooling hole array formed by the plurality of first film cooling holes.

With the above configuration (15), since $0.3L^* \leq L_1^*$ is satisfied, the first film cooling hole array is disposed on the trailing edge side where the pressure in the combustion gas passage is relatively low. Thus, it is possible to easily ensure the differential pressure across the impingement cooling holes. Further, with the above configuration (15), since $L_1^* \leq 0.7L^*$ is satisfied, the first film cooling hole array is disposed relatively close to the leading edge. Thus, it is possible to cool a relatively wide region between the leading edge and the trailing edge by a film boundary layer formed by the first film cooling holes. Thus, with the above configuration (15), it is possible to effectively suppress thermal damage to the airfoil portion at the position corresponding to the first high-density opening region of the insert.

(16) In some embodiments, in any one of the above configurations (1) to (15), the turbine blade further comprises a rib formed on an inner wall surface of the hollow portion and extending from a leading edge side to a trailing edge side of the airfoil portion, and the impingement cooling holes are offset from the rib in the blade height direction.

The inner wall surface of the airfoil portion may be provided with a rib for reinforcing the airfoil portion.

In the above configuration (16), in the turbine blade provided with the rib extending from the leading edge side to the trailing edge side of the airfoil portion, the impingement cooling holes are disposed offset from the rib in the blade height direction. Thus, in the turbine blade provided with the rib, it is possible to effectively suppress thermal damage to the airfoil portion at the position corresponding to the first high-density opening region of the insert.

(17) In some embodiments, in any one of the above configurations (1) to (16), the turbine blade comprises a thermal barrier coating disposed so as to cover a surface of the airfoil portion.

With the above configuration (17), since the surface of the airfoil portion is covered with the thermal barrier coating, it is possible to suppress thermal damage to the airfoil portion.

(18) In some embodiments, in any one of the above configurations (1) to (17), the turbine blade is a gas turbine stator blade.

With the above configuration (18), since the gas turbine stator blade as the turbine blade has the above configuration (1), as for the gas turbine stator blade as the turbine blade, it is possible to effectively suppress thermal damage to the airfoil portion at the position corresponding to the first high-density opening region of the insert.

(19) A gas turbine according to at least one embodiment of the present invention comprises: the turbine blade described in any one of the above (1) to (18); and a combustor for producing a combustion gas flowing through a combustion gas passage in which the turbine blade is disposed.

With the above configuration (19), since the insert has the first high-density opening region having a higher density of the impingement cooling holes than in the other regions, it is possible to effectively cool the airfoil portion at the position corresponding to the first high-density opening region. Additionally, with the above configuration (19), since the first film cooling holes are disposed at the position corresponding to the first high-density opening region or at the position closer to the leading edge than this position is to the leading edge, it is possible to improve the film cooling effect at the position corresponding to the first high-density opening region. Further, by the first film cooling holes disposed in the airfoil portion, it is possible to easily ensure the differential pressure across the impingement cooling holes, and it is possible to achieve a high cooling effect by the impingement cooling holes. Thus, with the above configuration (19), it is possible to effectively suppress thermal damage to the airfoil portion at the position corresponding to the first high-density opening region of the insert.

(20) In some embodiments, in the above configuration (19), the gas turbine includes multiple stages of rotor blades disposed in the combustion gas passage and multiple stages of stator blades disposed in the combustion gas passage, and the turbine blade is a stator blade or a rotor blade positioned downstream of first-stage rotor blades of the multiple stages of rotor blades.

According to the findings of the present inventor, in the course of passage through the first-stage stator blades, the flow velocity of the combustion gas discharged from the combustor and particles contained in the combustion gas increases, and a swirl component is imparted to the flow by the first-stage stator blades. The combustion gas and the particles then flow into stator blades and rotor blades downstream of the first-stage stator blades. As a result, separation of the thermal barrier coating becomes likely to occur at the stator blades or the rotor blades downstream of the first-stage stator blades.

In this regard, with the above configuration (20), since the stator blade or the rotor blade positioned downstream of the first-stage rotor blades has the above configuration (1), it is possible to effectively suppress thermal damage to the airfoil portion at the position corresponding to the first high-density opening region of the insert.

3. Advantageous Effects

At least one embodiment of the present invention provides a turbine blade and a gas turbine including the same whereby it is possible to suppress thermal damage.

DETAILED DESCRIPTION OF THE INVENTION

Embodiments of the present invention will now be described in detail with reference to the accompanying drawings. It is intended, however, that unless particularly identified, dimensions, materials, shapes, relative positions and the like of components described in the embodiments shall be interpreted as illustrative only and not intended to limit the scope of the present invention.

First, a gas turbine to which a turbine blade according to some embodiments is applied will be described.

The turbine blade according to some embodiments may be applied to a turbine other than the gas turbine (e.g., steam turbine).

Figure 1:
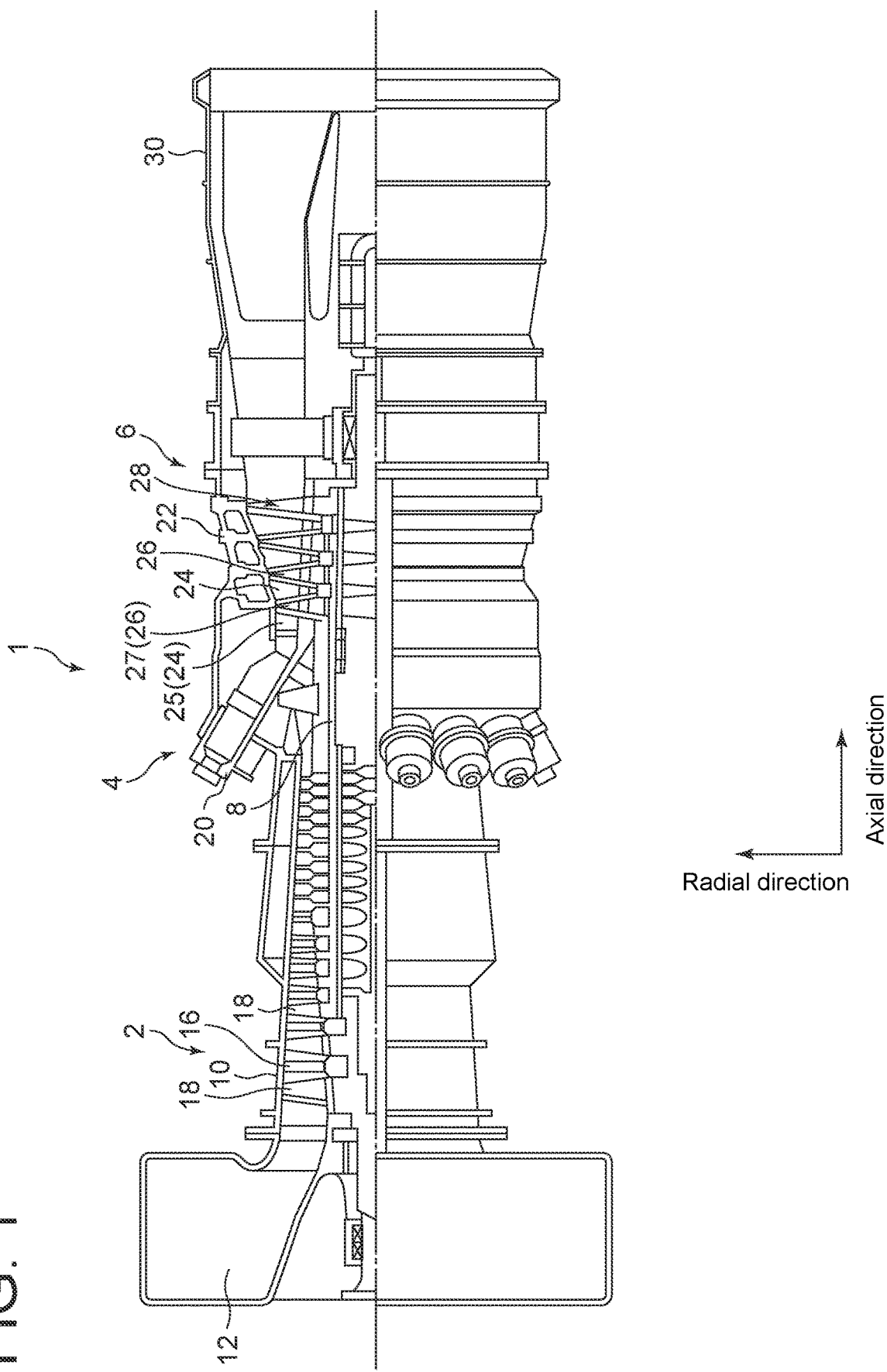
FIG. 1 is a schematic configuration diagram of a gas turbine to which a turbine blade according to an embodiment is applied.

FIG. 1 is a schematic configuration diagram of a gas turbine to which a turbine blade according to an embodiment is applied. As shown in FIG. 1, the gas turbine 1 includes a compressor 2 for producing compressed air, a combustor 4 for producing a combustion gas from the compressed air and fuel, and a turbine 6 configured to be rotationally driven by the combustion gas. In the case of the gas turbine 1 for power generation, a generator (not shown) is connected to the turbine 6.

The compressor 2 includes a plurality of stator blades 16 fixed to a compressor casing 10 and a plurality of rotor blades 18 implanted on a rotor 8 so as to be arranged alternately with the stator blades 16.

To the compressor 2, air sucked in from an air inlet 12 is supplied. The air flows through the plurality of stator blades 16 and the plurality of rotor blades 18 to be compressed into compressed air having a high temperature and a high pressure.

The combustor 4 is supplied with fuel and the compressed air produced in the compressor 2. The combustor 4 combusts the fuel to produce a combustion gas that serves as a working fluid of the turbine 6. As shown in FIG. 1, a plurality of combustors 4 may be disposed along the circumferential direction around the rotor inside a casing 20.

The turbine 6 has a combustion gas passage 28 formed by a turbine casing 22 and includes a plurality of stator blades 24 and a plurality of rotor blades 26 disposed in the combustion gas passage 28.

The stator blades 24 are fixed to the turbine casing 22, and a set of the stator blades 24 arranged along the circumferential direction of the rotor 8 forms a stator blade array. Further, the rotor blades are implanted on the rotor 8, and a set of the rotor blades 26 arranged along the circumferential direction of the rotor 8 forms a rotor blade array. The stator blade arrays and the rotor blade arrays are arranged alternately in the axial direction of the rotor 8.

The most upstream stator blade array of the plurality of stator blade arrays arranged in the axial direction of the rotor 8 in the combustion gas passage 28 is composed of a plurality of first-stage stator blades 25. Further, the most upstream rotor blade array of the plurality of rotor blade arrays arranged in the axial direction of the rotor 8 in the combustion gas passage 28 is composed of a plurality of first-stage rotor blades 27. Typically, in the combustion gas passage 28, the first-stage rotor blades 27 are disposed downstream of the first-stage stator blades 25, and the stator blades 24 and the rotor blades 26 at the second and following stages are disposed downstream of the first-stage rotor blades 27.

In the turbine 6, as the combustion gas introduced from the combustor 4 into the combustion gas passage 28 passes through the plurality of stator blades 24 and the plurality of rotor blades 26, the rotor 8 is rotationally driven. Thereby, the generator connected to the rotor 8 is driven to generate power. The combustion gas having driven the turbine 6 is discharged outside via an exhaust chamber 30.

In some embodiments, at least one of the rotor blades 26 or the stator blades 24 is a turbine blade 40 described below.

Figure 2:
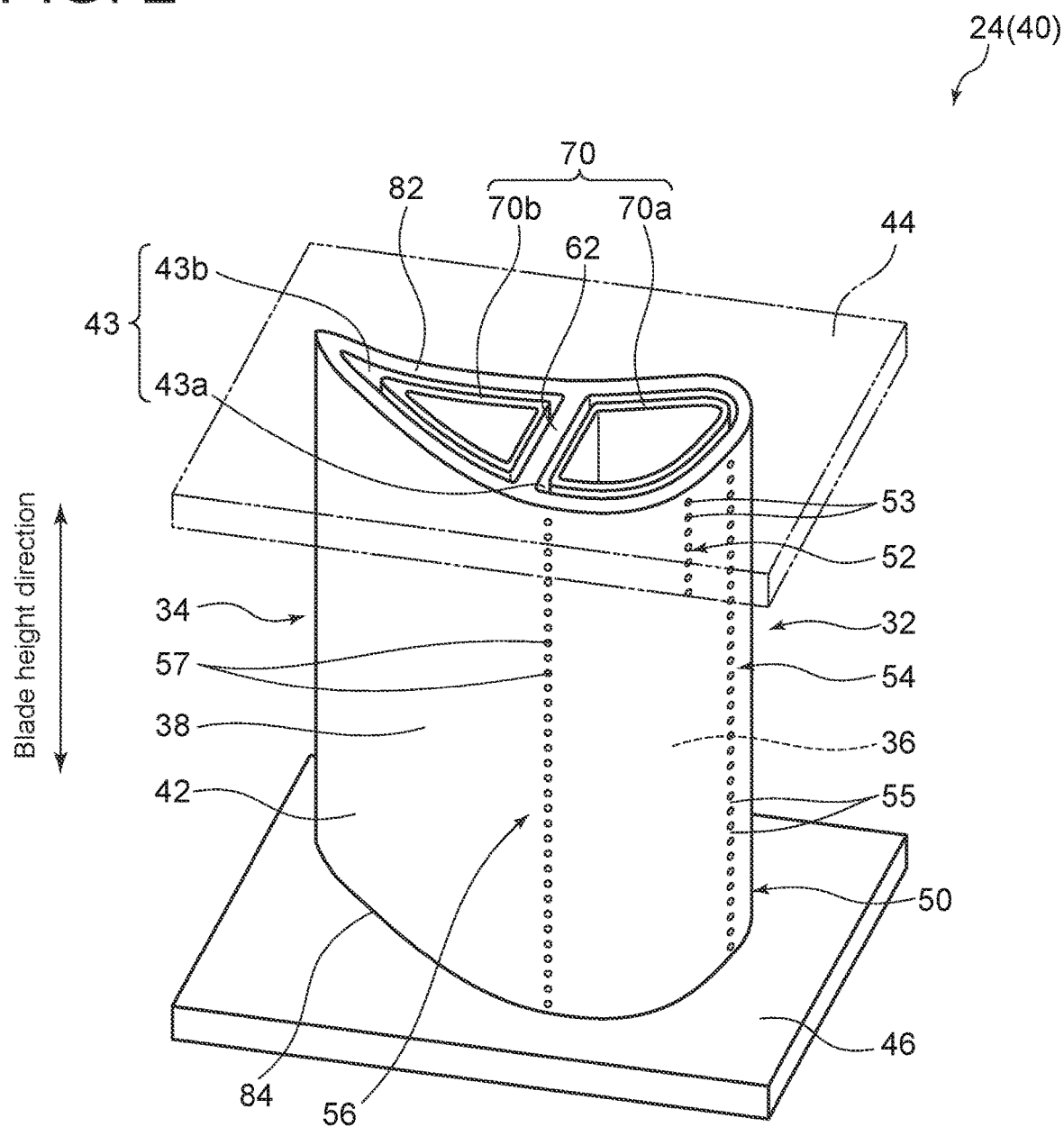
FIG. 2 is a perspective view of a stator blade (turbine blade) according to an embodiment.
Figure 3:
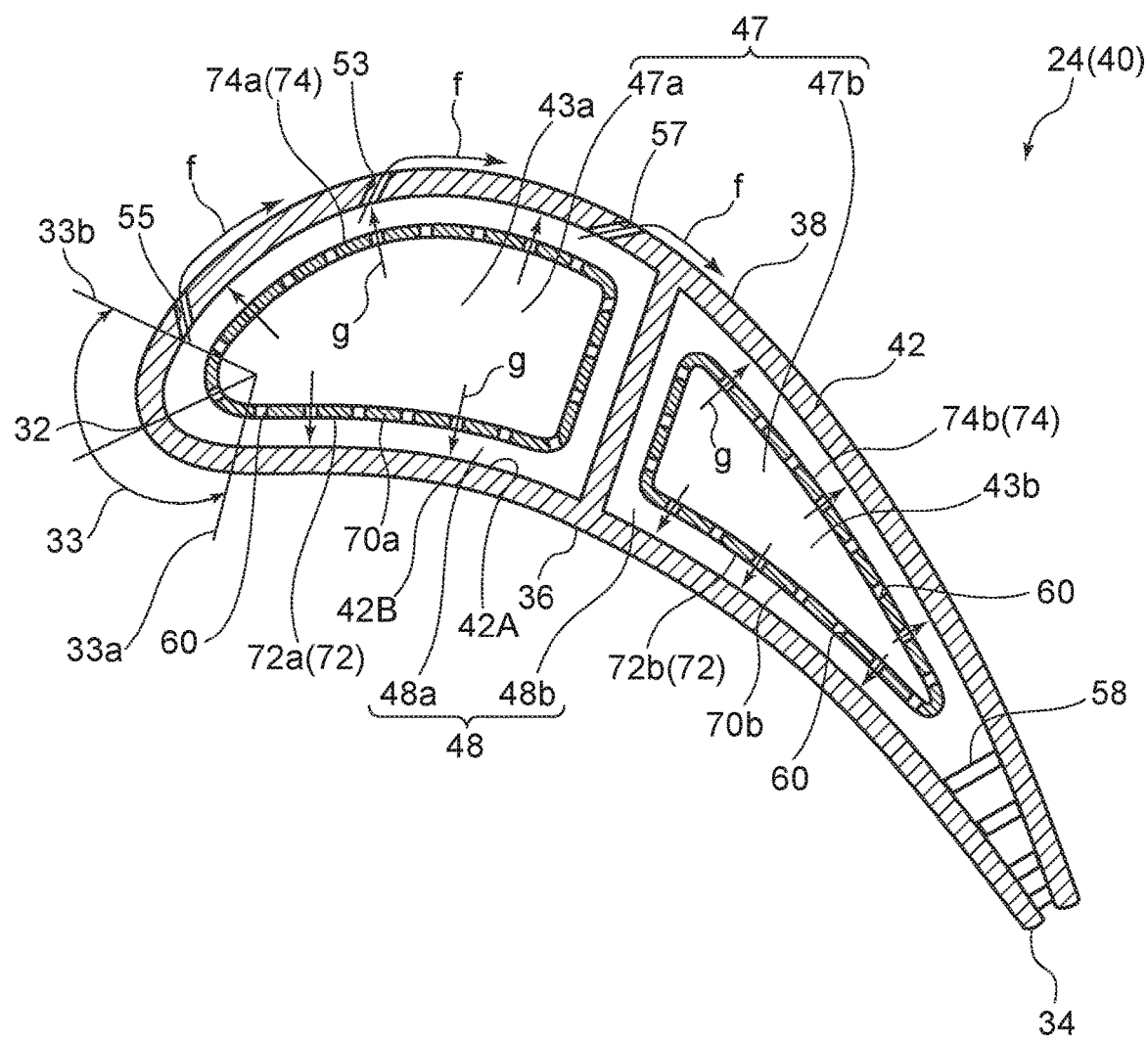
FIG. 3 is a schematic cross-sectional view of the stator blade (turbine blade) shown in FIG. 2 perpendicular to the blade height direction.

FIG. 2 is a perspective view of the stator blade 24 which is the turbine blade 40 according to an embodiment. FIG. 3 is a schematic cross-sectional view of the stator blade 24 (turbine blade 40) shown in FIG. 2 perpendicular to the blade height direction.

As shown in FIGS. 2 and 3, the stator blade 24 as the turbine blade 40 includes an airfoil portion 42, an outer shroud 44 disposed on the outer side of the airfoil portion 42 in the radial direction of the rotor 8 (see FIG. 1), an inner shroud 46 disposed on the inner side of the airfoil portion 42 in the radial direction, and an insert 70 disposed in a hollow portion 43 of the airfoil portion 42. In FIG. 2, for simplicity of the drawing, the outer shroud 44 is shown by the long-dashed double-dotted line.

The outer shroud 44 is supported by the turbine casing 22 (see FIG. 1), and the stator blade 24 is supported by the turbine casing 22 via the outer shroud 44. The airfoil portion 42 has an outer end 82 positioned adjacent to the outer shroud 44 (i.e., on the radially outer side) and an inner end 84 positioned adjacent to the inner shroud 46 (i.e., on the radially inner side).

As shown in FIGS. 2 and 3, the airfoil portion 42 of the stator blade 24 (turbine blade 40) has a leading edge 32 and a trailing edge 34 from the outer end 82 to the inner end 84. Further, the outer shape of the airfoil portion 42 is formed by a positive pressure side surface (pressure surface) 36 and a negative pressure side surface (suction surface) 38 extending along the blade height direction between the outer end 82 and the inner end 84.

The airfoil portion 42 has a hollow portion 43 formed so as to extend along the blade height direction. The hollow portion 43 is formed by an inner wall surface 42A (see FIG. 3) of the airfoil portion 42.

In the exemplary embodiment shown in FIGS. 2 and 3, the stator blade 24 has a partition wall 62 extending in the blade height direction inside the airfoil portion 42, and the hollow portion 43 includes a forward hollow portion 43*a* positioned on the leading edge 32 side of the partition wall 62 and an after hollow portion 43*b* positioned on the trailing edge 34 side of the partition wall 62.

The insert 70 disposed in the hollow portion 43 of the airfoil portion 42 has a sleeve shape extending along the blade height direction, and includes a surface 72 facing the inner wall surface 42A of the airfoil portion 42 on the pressure surface 36 side and a surface 74 facing the inner wall surface 42A of the airfoil portion 42 on the suction surface 38 side.

In the exemplary embodiment shown in FIGS. 2 and 3, the airfoil portion 42 includes a plurality of inserts 70, including a forward insert 70*a* disposed in the forward hollow portion 43*a* and an after insert 70*b* disposed in the after hollow portion 43*b*. The forward insert 70*a* includes surfaces 72*a*, 74*a* as the surfaces 72, 74, and the after insert 70*b* includes surfaces 72*b*, 74*b* as the surfaces 72, 74.

In some embodiments, the stator blade 24 may not have the partition wall 62, and the airfoil portion 42 may have a single hollow portion 43 formed so as to extend along the blade height direction from the leading edge to the trailing edge within the airfoil portion 42 (i.e., the hollow portion 43 may not divided into the forward hollow portion 43*a* and the after hollow portion 43*b* by the partition wall 62). Further, the insert 70 may be a single member disposed in such a hollow portion 43 (i.e., the insert 70 may not include two or more members such as the forward insert 70*a* and the after insert 70*b*).

In the following description, the forward hollow portion 43*a* and the after hollow portion 43*b* are also collectively referred to as the hollow portion 43. Further, the forward insert 70*a* and the after insert 70*b* are also collectively referred to as the insert 70, and portions (e.g., surface 72*a* and surface 72*b*) related to the forward insert 70*a* and the after insert 70*b* are also collectively referred.

By providing the insert 70 in the airfoil portion 42, the hollow portion 43 is divided into a main cavity 47 forming a space inside the insert 70 and an intermediate cavity 48 formed between the inner wall surface 42A of the airfoil portion 42 and the insert 70. In the example shown in FIG. 3, the forward hollow portion 43*a* is divided into a leading main cavity 47*a* and a leading intermediate cavity 48*a*, and the after hollow portion 43*b* is divided into a trailing main cavity 47*b* and a trailing intermediate cavity 48*b*.

Further, as shown in FIG. 3, the insert 70 has a plurality of impingement cooling holes 60. The impingement cooling holes 60 are formed at least in the surface 72 or the surface 74 (surfaces facing the inner wall surface 42A of the airfoil portion 42 on the pressure surface 36 side and the suction surface 38 side, respectively) constituting the insert 70.

A coolant introduced from the outside to the main cavity 47 inside the insert 70 is jetted to the inner wall surface 42A of the airfoil portion 42 via the impingement cooling holes 60 formed in the insert 70 (see arrow g in FIG. 3). Using the difference in pressure across the impingement cooling holes 60, i.e., differential pressure between the main cavity 47 and the intermediate cavity 48, a coolant is jetted to the inner wall surface 42A via the impingement cooling holes 60. Thereby, the inner wall surface 42A of the airfoil portion 42 is cooled.

As shown in FIGS. 2 and 3, the airfoil portion 42 has a plurality of film cooling holes 50.

The film cooling holes 50 includes a plurality of upstream film cooling holes (53, 55) disposed, in the suction surface 38 of the airfoil portion 42, at a position corresponding to a high-density opening region $S_H$ (first high-density opening region) having a higher density of the impingement cooling holes 60 than in the other regions or at a position closer to the leading edge than this position. In the exemplary embodiment shown in FIGS. 2 and 3, the film cooling holes 50 include a plurality of first film cooling holes 53, a plurality of second film cooling holes 55, and a plurality of third film cooling holes 57 opening to the inner wall surface 42A and an outer wall surface 42B (see FIG. 3) of the airfoil portion 42. Among them, the first film cooling holes 53 and the second film cooling holes 55 are the "upstream film cooling holes". A specific configuration of the "upstream film cooling holes" is not limited to the example shown in FIGS. 2 and 3. For instance, the "upstream film cooling holes" may include only one of the first film cooling holes 53 or the second film cooling holes 55.

In the exemplary embodiment shown in FIG. 2, the pluralities of first to third film cooling holes 53, 55, 57 are each arranged along the blade height direction and form a first film cooling hole array 52, a second film cooling hole array 54, and a third film cooling hole array 56 along the bright height direction, respectively. The film cooling hole array (52, 54) formed by the upstream film cooling holes (53, 55) corresponds to an "upstream film cooling hole array".

The plurality of second film cooling holes 55 is disposed closer to the leading edge than the first film cooling holes 53 in the blade surface (pressure surface 36 or suction surface 38) of the airfoil portion 42. Further, the plurality of third film cooling holes 57 is disposed closer to the trailing edge than the first film cooling holes 53 in the blade surface (pressure surface 36 or suction surface 38) of the airfoil portion 42.

Further, in the embodiment shown in FIG. 3, the leading edge 32 has a leading edge region 33 extending over a predetermined range on the pressure surface 36 side and the suction surface 38 side across the leading edge 32. More specifically, the leading edge region 33 extends from the outer end 82 to the inner end 84 in the blade height direction, and the combustion gas impinges on this region and flows along the blade surface. Consequently, this region has a high heat transfer rate and is exposed to a high heat load, thus being most likely to be heated. The suction surface 38 side of the leading edge region 33 spreads along the suction surface 38 from the position of the leading edge 32 to a position in the vicinity of openings of the second film cooling holes 55 (second film cooling array 54) inclined to the leading edge 32. This position forms a suction-side end 33b of the leading edge region 33 on the suction surface 38 side. Further, the pressure surface 36 side spreads along the pressure surface 36 from the position of the leading edge 32 a length equal to the length between the leading edge 32 and the suction-side end 33b along the blade surface in the leading-edge-to-trailing-edge direction. This position forms a pressure-side end 33a of the leading edge region 33 on the pressure surface 36 side. The leading edge region 33 is a region formed between the pressure-side end 33a and the suction-side end 33b along the blade surface across the leading edge 32.

In the embodiment shown in FIGS. 2 and 3, the first to third film cooling holes 53, 55, 57 are disposed in the suction surface 38.

In some embodiments, at least one of the first to third film cooling holes 53, 55, 57 may be disposed in the pressure surface 36. Alternatively, besides the first to third film cooling holes 53, 55, 57, other film cooling holes may be disposed in the pressure surface 36.

The coolant introduced into the intermediate cavity 48 of the airfoil portion 42 is discharged to the outer surface of the blade via the film cooling holes using the differential pressure between the intermediate cavity 48 and the combustion gas, and when the coolant flows through the outer surface, a film boundary layer is formed on the outer surface. The coolant is guided to the outer wall surface 42B of the airfoil portion 42 via the first to third film cooling holes 53, 55, 57, and forms the film boundary layer (see arrow fin FIG. 3) which is a film flow on the outer wall surface 42B. This film coolant flow f prevents heat transfer from the combustion gas side to the airfoil portion 42.

In order to properly cool the airfoil portion 42 in the course of discharging the coolant from the main cavity 47 in the airfoil portion 42 to the combustion gas, an appropriate combination of impingement cooling and film cooling is important. While the pressure of the coolant supplied to the main cavity 47 is relatively stable, the pressure on the outer wall surface 42B of the airfoil portion 42 varies with the position of the blade surface. More specifically, the pressure is high on the pressure surface 36 side and low on the suction surface 38 side. Further, even on the same blade surface, the pressure is high on the leading edge 32, gradually decreases along the blade surface, and is minimized on the trailing edge 34.

The impingement cooling effect and the film cooling effect vary with the position of the film cooling holes. Generally, the purpose of film cooling is to form a boundary layer on the blade surface on the downstream side of the film cooling holes 50 with respect to the combustion gas flow direction and thereby prevent heat transfer from the combustion gas side to the airfoil portion 42. In contrast, impingement cooling jets a coolant from the impingement cooling holes 60 to the inner wall surface 42A of the airfoil portion 42 for impingement cooling of the inner wall surface 42A. Thus, impingement cooling has higher cooling effect than convection cooling. As the differential pressure across the impingement cooling holes 60 increases, the impingement cooling effect increases. Accordingly, appropriately combining impingement cooling and film cooling so as to decrease the pressure of the intermediate cavity 48 as possible and increase the differential pressure between the main cavity 47 and the intermediate cavity 48 is effective in cooling the airfoil portion 42.

The stator blade 24 (turbine blade 40) may have a pin fin 58 disposed, in the vicinity of the trailing edge 34 of the airfoil portion 42, between the inner wall surface 42A of the airfoil portion 42 on the pressure surface 36 side and the inner wall surface 42A of the airfoil portion 42 on the suction surface 38 side. By providing the pin fin 58, it is possible to more effectively cool the trailing edge 34 of the airfoil portion 42.

In some embodiments, the insert 70 includes a high-density opening region $S_H$ having a higher density of the impingement cooling holes 60 than in the other surface regions of the insert 70.

Figure 4A:
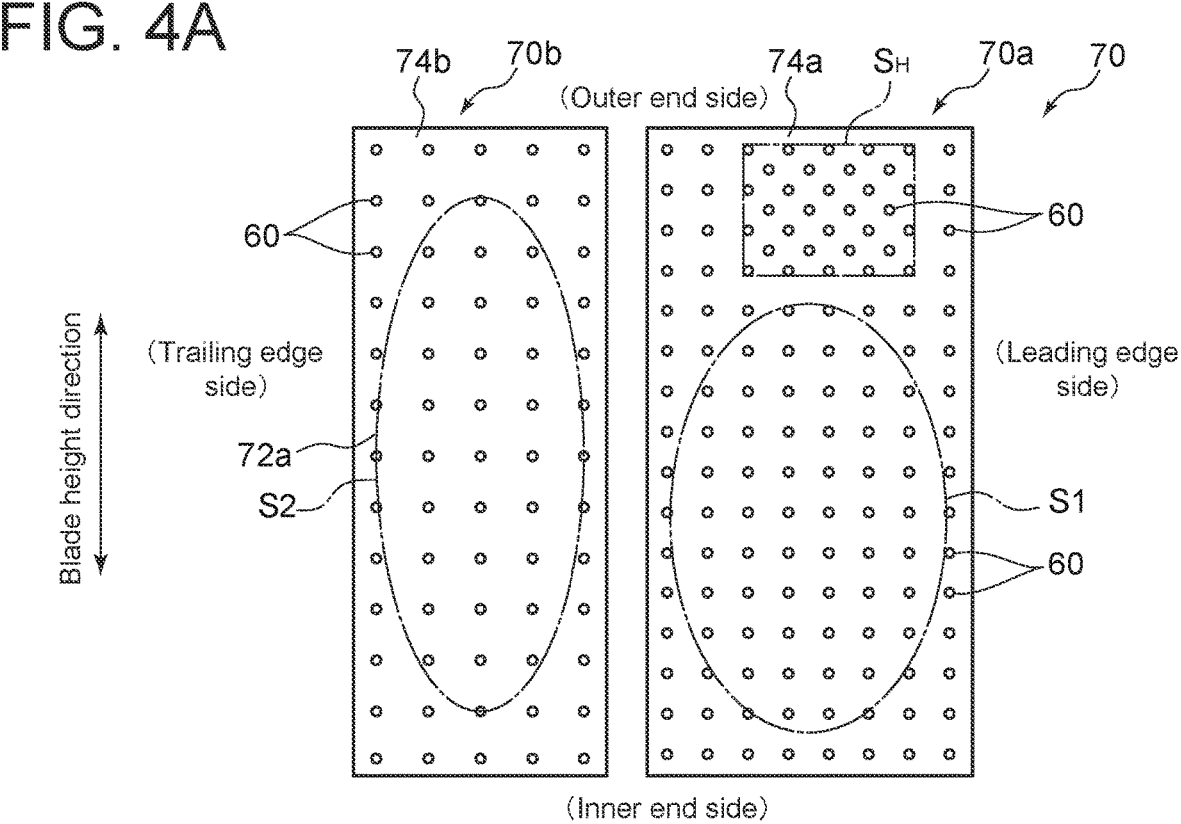
FIG. 4A is an example of development view of the side of an insert when viewed from a suction side of an airfoil portion according to an embodiment.
Figure 4B:
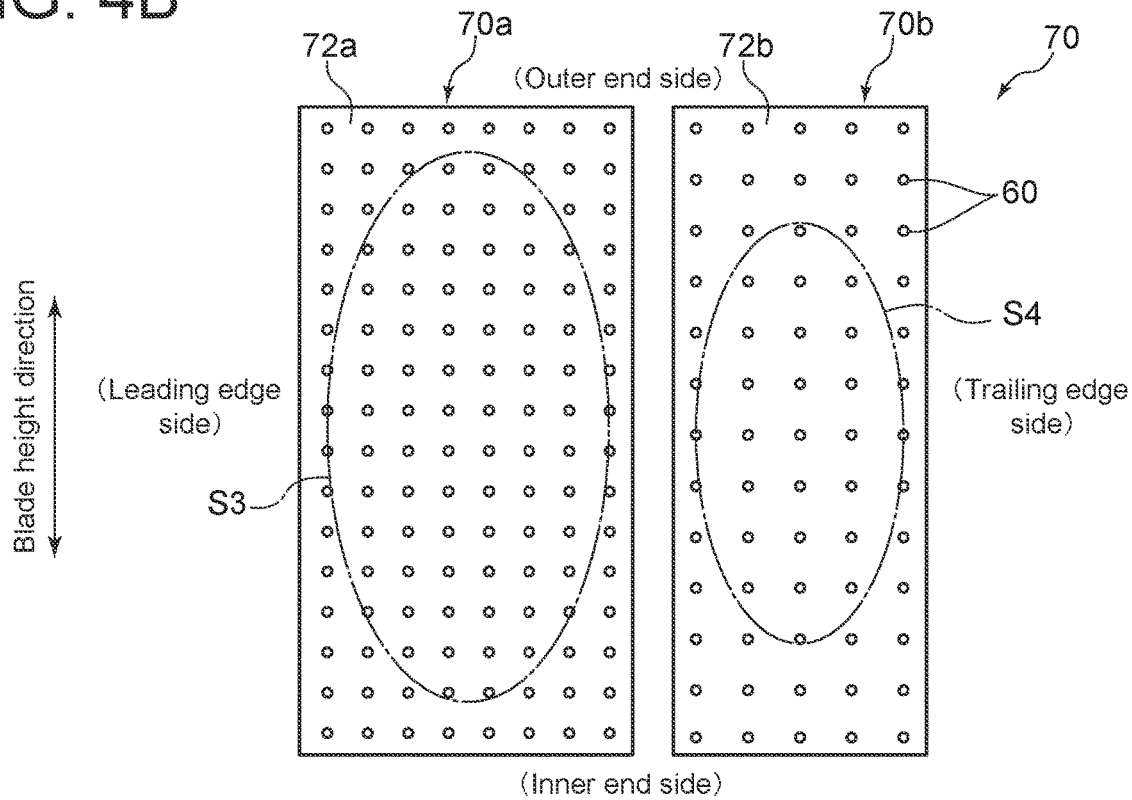
FIG. 4B is an example of development view of the side of an insert when viewed from a pressure side of an airfoil portion according to an embodiment.

Herein, FIGS. 4A and 4B are developed plan views of the side of the insert 70 according to an embodiment. FIGS. 4A and 4B are examples of developed view of the side of the insert 70 (forward insert 70a and after insert 70b) viewed from the suction surface 38 side and the pressure surface 36 side of the airfoil portion 42, respectively.

As shown in FIGS. 4A and 4B, the insert 70 (forward insert 70a and after insert 70b) has the plurality of impingement cooling holes 60. Further, as shown in FIG. 4A, the insert 70 includes the high-density opening region $S_H$ on the surface 74 (surface 74 on the suction surface 38 side) facing the inner wall surface 42A of the airfoil portion 42 on the suction surface 38 side. In other words, the high-density opening region $S_H$ is formed so as to face the inner wall surface 42A of the airfoil portion 42 on the suction surface 38 side.

In the exemplary embodiment shown in FIGS. 4A and 4B, the high-density opening region $S_H$ is formed on the surface 74a of the forward insert 70a.

The high-density opening region $S_H$ is a surface region in which the opening density of the impingement cooling holes 60 is higher than in the other surface regions of the insert 70.

Figure 5A:
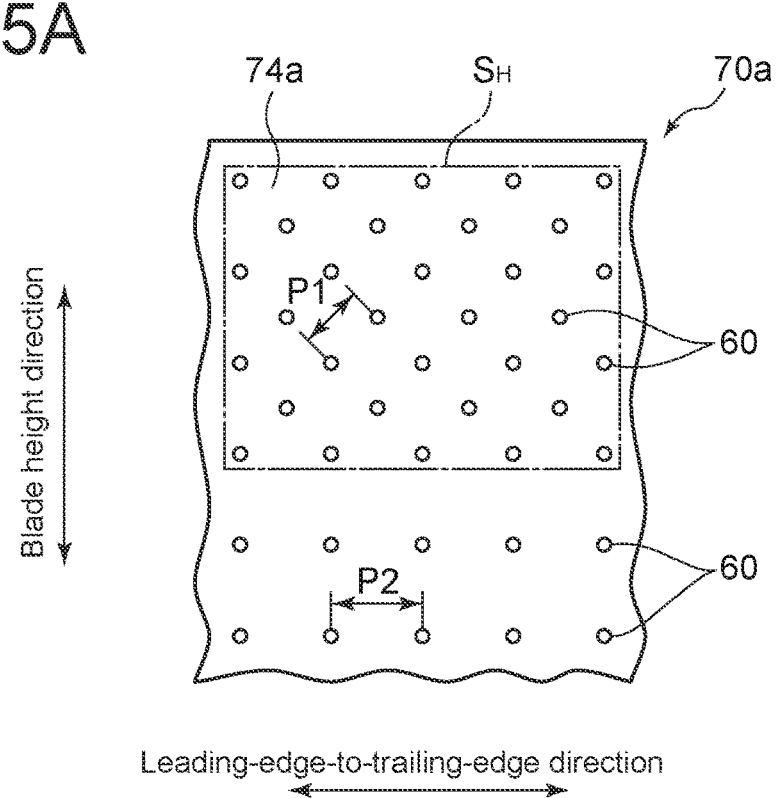
FIG. 5A is a diagram showing an example of an array of impingement cooling holes on a surface of an insert.
Figure 5B:
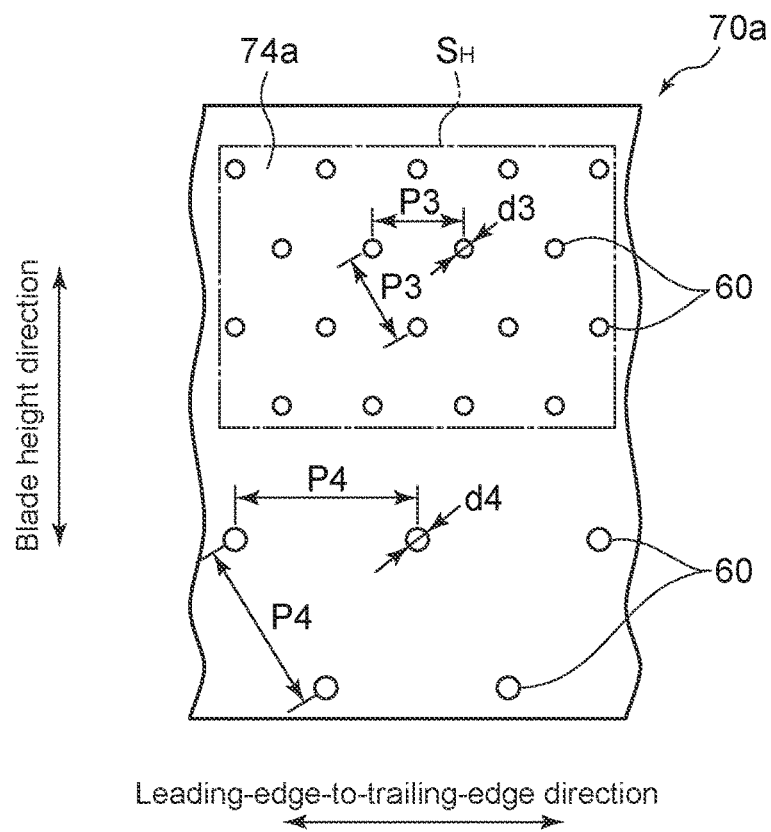
FIG. 5B is a diagram showing an example of an array of impingement cooling holes on a surface of an insert.
Figure 6:
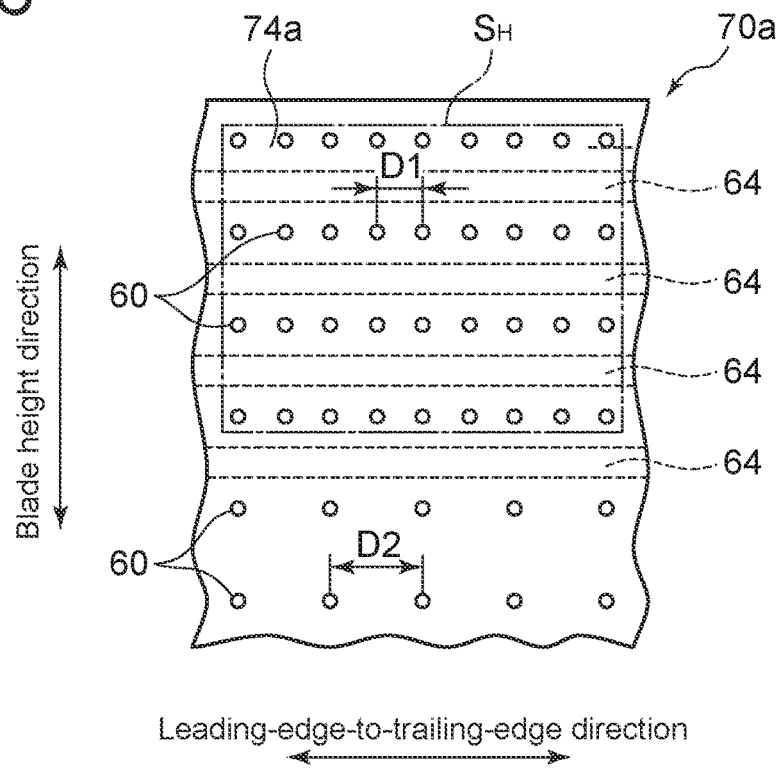
FIG. 6 is a diagram showing an example of an array of impingement cooling holes on a surface of an insert.
Figure 7:
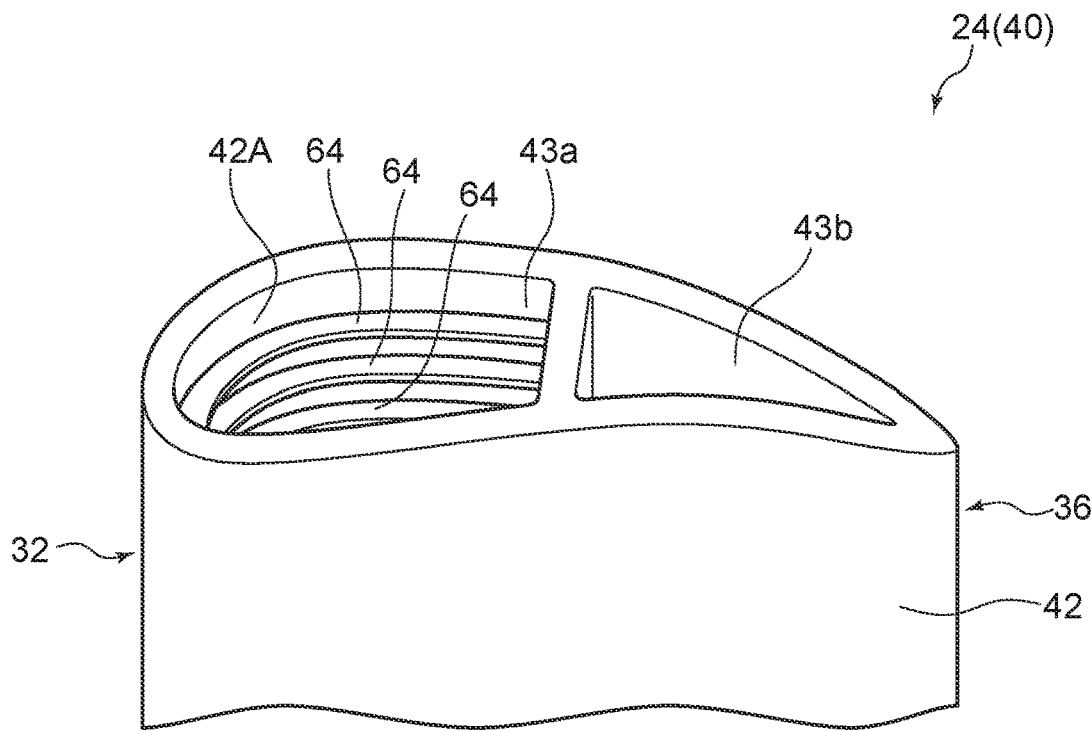
FIG. 7 is a perspective view of an airfoil portion of a turbine blade according to an embodiment.

Here, FIGS. 5A, 5B, and 6 are diagrams each showing an example of an array of the impingement cooling holes 60 on the surface of the insert 70. Further, FIG. 7 is a perspective view of the airfoil portion 42 of the turbine blade 40 according to an embodiment.

The opening density can be represented by a distance (pitch) P between the centers of adjacent impingement cooling holes 60. For instance, on the surface of the insert 70 shown in FIG. 5A, the pitch P1 of the impingement cooling holes 60 in the high-density opening region $S_H$ is smaller than the pitch P2 of the impingement cooling holes 60 in the other surface regions.

The opening density can also be represented by a ratio of the inner diameter d and the distance (pitch) P between the centers of adjacent impingement cooling holes 60. For instance, as shown in FIG. 5B, in the case where the inner diameter of the impingement cooling holes 60 varies, the opening density can be represented by [d/P]. In the case of the impingement cooling holes 60 in the high-density opening region $S_H$ and in the other regions, the opening density can be represented by [d3/P3] and [d4/P4], respectively. Which region has larger opening density depends on the magnitude of the ratio. When the hole diameter d is the same the opening density [d/P] increases with a decrease in the pitch P.

Although in FIGS. 4A, 4B, and 5 the array of the impingement cooling holes 60 is a square array except the high-density opening region $S_H$, the array may be a staggered array in which lines connecting the impingement cooling holes 60 form a triangle as shown in FIG. 5B.

Further, in a certain direction, if the inner diameter of the impingement cooling holes 60 is the same, the opening density can be represented by a distance D between the centers of adjacent impingement cooling holes 60. For instance, on the surface of the insert 70 shown in FIG. 6, the distance D1 of the impingement cooling holes 60 in the high-density opening region $S_H$ in the leading-edge-to-trailing-edge direction (also referred to as chordwise direction) is smaller than the distance D2 of the impingement cooling holes 60 in the other surface regions in the same direction.

The leading-edge-to-trailing-edge direction is a direction perpendicular to the blade height direction on the surface (surface 72 or 74) of the insert 70 or the blade surface (pressure surface 36 or suction surface 38) of the airfoil portion 42.

Alternatively, the opening density can be represented by a ratio (surface ratio) of a total area of the impingement cooling holes 60 to a unit area of the surface of the insert 70.

In some embodiments, as shown in FIG. 7, the inner wall surface 42A of the airfoil portion 42 of the turbine blade 40 is provided with a rib 64 extending from the leading edge 32 side to the trailing edge 34 side of the airfoil portion 42. The rib 64 is provided to suppress thermal deformation of the airfoil portion 42, for instance.

In the case where the rib 64 is provided in the turbine blade 40, for instance as shown in FIG. 6, the impingement cooling holes 60 may be positioned offset from the rib 64 in the blade height direction. In other words, the impingement cooling holes 60 may be disposed between adjacent ribs 64 in the blade height direction.

In some embodiments, the high-density opening region $S_H$ has a higher opening density than the rest of the surface of the insert 70 on which the high-density opening region $S_H$ is formed. For instance, in the case where the high-density opening region $S_H$ is formed on the surface 74 of the insert 70 on the suction surface 38 side, the high-density opening region $S_H$ has a higher opening density than the rest of the surface 74 of the insert 70.

Further, in some embodiments, the high-density opening region $S_H$ has a higher opening density than a surface region on a surface opposite to the surface of the insert 70 on which the high-density opening region $S_H$ is formed. For instance, in the case where the high-density opening region $S_H$ is formed on the surface 74 of the insert 70 on the suction surface 38 side, the high-density opening region $S_H$ has a higher opening density than the surface region on the surface 72 on the pressure surface 36 side opposite to the surface 74 of the insert 70 on the suction surface 38 side (i.e., the surface 72 of the insert 70 on the pressure surface 36 side facing the inner wall surface 42A of the airfoil portion 42 on the pressure surface 36 side).

In the exemplary embodiment shown in FIGS. 4A and 4B, the high-density opening region $S_H$ has a higher opening density than the other surface regions S1 and S2 on the surface 74 of the insert 70 on the suction surface 38 side on which the high-density opening region $S_H$ is formed, and has a higher opening density than the surface regions S3 and S4 on the surface 72 of the insert 70 on the pressure surface 36 side.

The surface region S1 is a surface region other than the high-density opening region $S_H$ on the surface 74a of the forward insert 70a on the suction surface 38 side; the surface region S2 is a surface region on the surface 74b of the after insert 70b on the suction surface 38 side; the surface region S3 is a surface region on the surface 72a of the forward insert 70a on the pressure surface 36 side; and the surface region S4 is a surface region on the surface 72b of the after insert 70b on the pressure surface 36 side.

In the high-density opening region $S_H$, since the opening density of the impingement cooling holes 60 is higher than in the other surface regions S1 to S4, the flow rate of the coolant jetted from the main cavity 47 inside the insert 70 to the inner wall surface 42A of the airfoil portion 42 via the impingement cooling holes 60 is higher than in the other surface regions S1 to S4. Thus, it is possible to effectively cool the airfoil portion 42 at the position corresponding to the high-density opening region $S_H$, i.e., on the suction surface 38 side of the airfoil portion 42.

Figure 8:
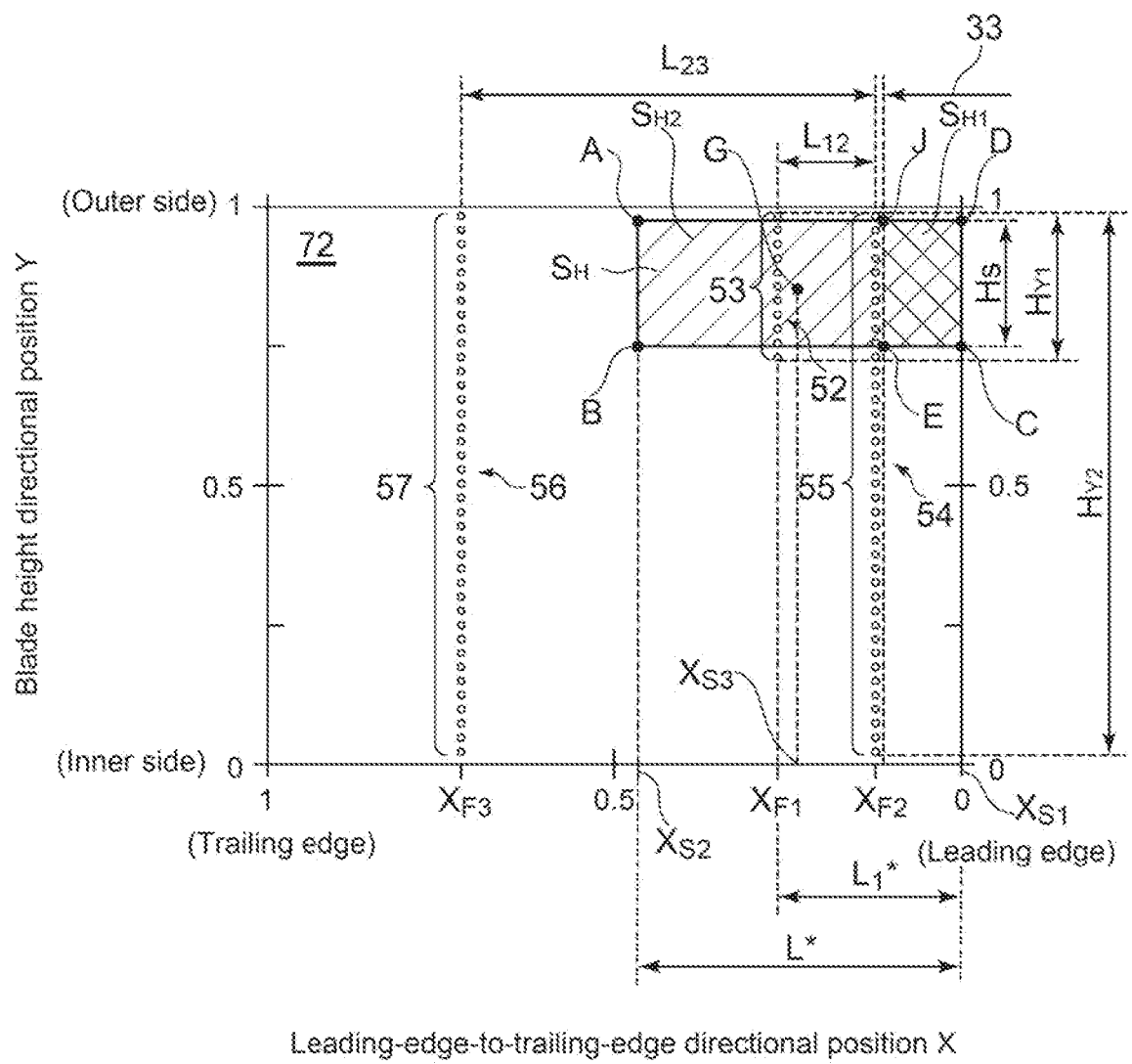
FIG. 8 is a graph schematically showing a developed plan view of a suction surface of an airfoil portion of a turbine blade according to an embodiment.

FIG. 8 is a graph schematically showing a developed plan view of the suction surface 38 of the airfoil portion 42 of the turbine blade 40 according to an embodiment.

The horizontal axis of FIG. 8 represents a position X in the leading-edge-to-trailing-edge direction in the developed plan view of the suction surface 38 of the airfoil portion 42 when the position of the leading edge 32 (see FIG. 3) in the leading-edge-to-trailing-edge direction is 0, and the position of the trailing edge 34 (see FIG. 3) in the leading-edge-to-trailing-edge direction is 1.

The vertical axis of FIG. 8 represents a position Y in the inner-end-to-outer-end direction (i.e., the radial direction of the rotor 8 (see FIG. 1)) in the developed plan view of the suction surface 38 of the airfoil portion 42 when the position of the inner end 84 (see FIG. 2) in the radial direction is 0, and the position of the outer end 82 (see FIG. 2) in the radial direction is 1.

The graph of FIG. 8 shows the pluralities of first to third film cooling holes 53, 55, 57, and the first to third film cooling hole arrays 52, 54, 56 formed by the pluralities of first to third film cooling holes 53, 55, 57 respectively.

Further, the graph of FIG. 8 shows a region on the blade surface corresponding to the high-density opening region $S_H$ of the insert 70 disposed in the hollow portion 43 of the airfoil portion 42 by the hatched area.

In the example shown in FIG. 8, the high-density opening region $S_H$ is represented by a rectangular region (region ABCD) surrounded by the dots ABCD. The side AB indicates a trailing end of the high-density opening region $S_H$ which defines the closest position to the trailing edge 34. The side CD indicates a leading end of the high-density opening region $S_H$ which defines the closet position to the leading edge 32. The side AD indicates an outer end of the high-density opening region $S_H$ which defines the closest position to the outer end 82 in the blade height direction. The side BC indicates an inner end of the high-density opening region $S_H$ which defines the closest position to the inner end 84 in the blade height direction. Further, when the central position of the region ABCD is defined as a geometric center G, the position of the geometric center G in the leading-edge-to-trailing-edge direction is halfway between the leading end and the trailing end and coincides with the position of the midpoint of the side AD or the side BC in the leading-edge-to-trailing-edge direction. Further, the position of the geometric center G in the blade height direction is halfway between the outer end and the inner end and coincides with the position of the midpoint of the side AB or the side CD in the blade height direction.

The shape of the high-density opening region $S_H$ may be any shape, not limited to the example shown in FIG. 8. In the case where the high-density opening region $S_H$ has a rectangular shape shown in FIG. 8, the geometric center G coincides with the midpoint in the leading-edge-to-trailing-edge direction and the midpoint in the blade height direction in the high-density opening region $S_H$. However, when considering the high-density opening region $S_H$ in any shape including an asymmetric shape, the high-density opening region $S_H$ is regarded as one figure, and the geometric center G is defined as the center of the figure defined by the region ABCD (the center of area when the figure is thought in terms of area). Under this definition, features related to the geometric center G described below apply to the high-density opening region $S_H$ having any shape.

Further, as shown in FIG. 8, the high-density opening region $S_H$ includes a leading edge high-density opening region $S_{H1}$ (second high-density opening region) formed in the leading edge region 33, and a trailing edge high-density opening region $S_{H2}$ (third high-density opening region) adjoining the leading edge high-density opening region $S_{H1}$ in the leading-edge-to-trailing-edge direction and formed closer to the trailing edge 34.

More specifically, the leading edge high-density opening region $S_{H1}$ is represented by a rectangular region (region DCEJ) surrounded by the dots DCEJ. The leading edge high-density opening region $S_{H1}$ may be disposed in at least a part of the leading edge region 33 (see FIG. 3) in the leading-edge-to-trailing-edge direction. Although in the example shown in FIG. 8, the side CD, which is the leading end of the leading edge high-density opening region $S_{H1}$, coincides with the position of the leading edge 32, in other embodiments, the leading edge high-density opening region $S_{H1}$ may be formed on both sides across the leading edge 32 over the substantially entire width of the leading edge region 33 (see FIG. 3) in the leading-edge-to-trailing-edge direction.

Further, the trailing edge high-density opening region $S_{H2}$ spreads over a range substantially equal to the adjoining leading edge high-density opening region $S_{H1}$ in the blade height direction, and is represented by a rectangular region (region ABEJ) surrounded by the dots ABEJ. The opening density of the leading edge high-density opening region $S_{H1}$ is higher than the opening density of the trailing edge high-density opening region $S_{H2}$. The side EJ forming a boundary between the leading edge high-density opening region $S_{H1}$ and the trailing edge high-density opening region $S_{H2}$ coincides with the position of the suction-side end 33b. The side EJ is a boundary line extending in the blade height direction along the second film cooling holes 55 (second film cooling hole array 54).

As described above, although the leading edge region 33 has a higher heat transfer rate and more easily heated than the other regions on the suction-side blade surface, since the opening density of the leading edge high-density opening region $S_{H1}$ in the leading edge region 33 is higher than the opening density of the other regions on the suction-side blade surface including the trailing edge high-density opening region $S_{H2}$, it is possible to suppress thermal damage to the leading edge region 33 of the airfoil portion 42.

In the airfoil portion 42 according to the developed plan view of FIG. 8, the plurality of first film cooling holes 53 is disposed in the suction surface 38 of the airfoil portion 42 at a position corresponding to the high-density opening region $S_H$ and corresponds to the "upstream film cooling holes".

More specifically, in the developed plan view of FIG. 8, when $X_{F1}$ is the position of the plurality of first film cooling holes 53 (i.e., the position of the first film cooling hole array) in the leading-edge-to-trailing-edge direction, $X_{S1}$ is the position of the leading end of the high-density opening region $S_H$, and $X_{S2}$ is the position of the trailing end of the high-density opening region $S_H$, $X_{F1}$ is located between $X_{S1}$ and $X_{S2}$ (i.e., satisfies a relationship of $X_{S1} \leq X_{F1} \leq X_{S2}$).

In other words, a distance from the leading edge 32 to the position $X_{F1}$ of the first film cooling holes 53 along the blade surface in the leading-edge-to-trailing-edge direction is longer than a distance from the leading edge 32 to the position $X_{S1}$ of the leading end along the blade surface in the leading-edge-to-trailing-edge direction, and is shorter than a distance from the leading edge 32 to the position $X_{S2}$ of the trailing end along the blade surface in the leading-edge-to-trailing-edge direction.

Further, in this embodiment, when $X_{S3}$ is the position of the geometric center G of the high-density opening region $S_H$ in the leading-edge-to-trailing-edge direction, the position $X_{S3}$ of the geometric center G is located on the suction side between the position $X_{S1}$ of the leading end and the position $X_{S2}$ of the trailing end. In other words, the midpoint of the high-density opening region $S_H$ in the leading-edge-to-trailing-edge direction is located on the suction side. Further, the position of the geometric center G of the high-density opening region $S_H$ in the blade height direction is located on a straight line connecting the midpoint of the side AD and the midpoint of the side BC.

As described above, by providing the first film cooling holes 53 as the "upstream film cooling holes" at the position corresponding to the high-density opening region $S_H$ (i.e., position satisfying a relationship of $X_{S1} \leq X_{F1} \leq X_{S2}$), it is possible to improve the film cooling effect of the airfoil portion 42 at the position corresponding to the high-density opening region $S_H$ (i.e., region shown by the hatched area in the developed plan view of FIG. 8).

In other words, in addition to the impingement cooling effect on the inner wall surface 42A of the airfoil portion 42 by the coolant in the high-density opening region $S_H$, the cooling effect of the film boundary layer formed so as to cover the high-density opening region $S_H$ is cumulatively added by the provision of the upstream film cooling holes (53, 55), so that the cooling is further enhanced in the high-density opening region $S_H$. Further, among the high-density opening region $S_H$, the leading edge high-density opening region $S_{H1}$ formed in the leading edge region 33 has a higher density of the impingement cooling holes 60 than the trailing edge high-density opening region $S_{H2}$ formed on the trailing edge 34 side. Thus, the cooling of the airfoil portion 42 on the leading edge 32 side with a high heat load is enhanced, and thermal damage is further suppressed.

Further, when the high-density opening region $S_H$ is disposed in the insert 70, the pressure of the intermediate cavity 48 between the surface 72 or the surface 74 of the insert 70 and the inner wall surface 42A of the airfoil portion 42 may be relatively increased, and the differential pressure across the impingement cooling holes 60 may be relatively decreased. In this case, the flow of the coolant via the impingement cooling holes 60 is disrupted, and the cooling effect of the airfoil portion 42 may not be sufficiently exhibited.

In this regard, by providing the upstream film cooling holes (53, 55) in the airfoil portion 42 as in the embodiment described above, the pressure of the intermediate cavity 48 in the vicinity of the upstream film cooling holes (53, 55) is decreased. As a result, it is possible to easily ensure the differential pressure across the impingement cooling holes 60, and it is possible to obtain a high cooling effect by the impingement cooling holes 60. Thus, it is possible to effectively suppress thermal damage to the airfoil portion 42 at the position corresponding to the high-density opening region $S_H$ of the insert 70.

The film boundary layer of the film cooling holes 50 is formed on the downstream side with respect to the combustion gas flow direction (leading-edge-to-trailing-edge direction) from the film cooling holes 50 along the blade surface of the airfoil portion 42. However, there is a limit to the effect of the film boundary layer. Therefore, it is desired that the first film cooling holes 53 are positioned as upstream as possible in a range where an appropriate differential pressure across the film cooling holes 50 can be kept, at the position $X_{S1}$ of the leading end of the high-density opening region $S_H$ upstream of the high-density opening region $S_H$ or at a position adjacently upstream or downstream of the position $X_{S1}$. Further, in the case where the range where the high-density opening region $S_H$ is disposed is elongated in the leading-edge-to-trailing-edge direction, a plurality of the first film cooling hole arrays 52 may be arranged at regular intervals in the leading-edge-to-trailing-edge direction.

In some embodiments, as shown in FIG. 8, the midpoint (geometric center G) of the high-density opening region $S_H$ in the blade height direction may be located on the outer side of the midpoint of the airfoil portion 42 in the blade height direction. In other words, in the developed plan view of FIG. 8, when the blade-height-directional position of the inner end 84 is Y=0, and the blade-height-directional position of the outer end 82 is Y=1, the midpoint of the high-density opening region $S_H$ in the blade height direction may be in a region where the blade-height-directional position Y is larger than 0.5.

Although in the exemplary embodiment shown in FIG. 8, the entire high-density opening region $S_H$ is in the region where the blade-height-directional position Y is larger than 0.5, in other embodiments, a part of the high-density opening region $S_H$ may be out of the region where the blade-height-directional position Y is larger than 0.5.

According to the findings of the present inventor, in the case where a thermal barrier coating is applied to the blade surface of the turbine blade 40, the thermal barrier coating tends to easily separate on a more outer side (region of 0.5≤Y≤1) than the midpoint (Y=0.5) of the airfoil portion in the blade height direction.

In this regard, as described above, when the geometric center G of the high-density opening region $S_H$ of the impingement cooling holes 60 is in a region (0.5≤Y≤1) on the outer side of the airfoil portion 42 in the blade height direction, it is possible to effectively suppress thermal damage to the airfoil portion 42 at the position where separation of the thermal barrier coating is likely to occur.

In some embodiments, when the blade-height-directional position of the inner end 84 is Y=0, and the blade-height-directional position of the outer end 82 is Y=1, the geometric center G of the high-density opening region $S_H$ may be positioned in a region where the blade height direction Y is not less than 0.75 or in a region where the blade-height-directional position Y is not less than 0.8.

In this case, the entire high-density opening region $S_H$ may be in the region where the blade height direction Y is not less than 0.75 or in the range where the blade-height-directional position Y is not less than 0.8.

In some embodiments, the turbine blade 40 may be a rotor blade 26. In this case, the inner side of the rotor blade 26 (turbine blade 40) in the blade height direction corresponds to the root side of the rotor blade 26, and the outer side of the rotor blade 26 in the blade height direction corresponds to the tip side of the rotor blade 26.

In some embodiments, as shown in FIG. 8, the first film cooling hole array 52 formed by the plurality of first film cooling holes 53 is formed over a blade height range including at least the high-density opening region $S_H$ of the insert 70. In other words, in the developed plan view of FIG. 8, a range $H_S$ in the blade height direction in which the high-density opening region $S_H$ is formed is included in a range $H_{Y1}$ in the blade height direction in which the plurality of first film cooling holes 53 constituting the first film cooling hole array 52 is formed.

Thus, since the first film cooling hole array 52 is formed over a blade height range including at least the high-density opening region $S_H$ of the impingement cooling holes 60, it is possible to effectively cool the airfoil portion at the position corresponding to the high-density opening region $S_H$ by the film boundary layer of the coolant formed by the first film cooling holes.

In some embodiments, the plurality of second film cooling holes 55 is disposed closer to the leading edge 32 of the airfoil portion 42 than the plurality of first film cooling holes 53 in the blade surface (pressure surface 36 or suction surface 38) of the airfoil portion 42 corresponding to the surface (surface 72 or 74) of the insert 70 on which the high-density opening region $S_H$ of the impingement cooling holes 60 is formed.

For instance, in the exemplary embodiment shown in FIGS. 2 and 3, the high-density opening region $S_H$ of the impingement cooling holes 60 is formed on the surface 74 (see FIG. 3) of the insert 70 facing the inner wall surface 42A of the airfoil portion 42 on the suction surface 38 side. Further, the plurality of second film cooling holes 55 is disposed closer to the leading edge 32 of the airfoil portion 42 than the plurality of first film cooling holes 53 in the suction surface 38 of the airfoil portion 42 corresponding to the surface 74.

Referring to the developed plan view of FIG. 8, in the airfoil portion 42 according to the developed plan view, when $X_{F2}$ is the position of the plurality of second film cooling holes 55 (i.e., the position of the second film cooling hole array) in the leading-edge-to-trailing-edge direction, the position $X_{F2}$ and the position $X_{F1}$ of the first film cooling holes 53 in the same direction satisfy a relationship of $X_{F2} \leq X_{F1}$. In other words, a distance from the leading edge 32 to the position $X_{F1}$ of the first film cooling holes 53 along the blade surface in the leading-edge-to-trailing-edge direction is longer than a distance from the leading edge 32 to the position $X_{F2}$ of the second film cooling holes 55 along the blade surface in the leading-edge-to-trailing-edge direction.

In this embodiment, the midpoint of the high-density opening region $S_H$ in the leading-edge-to-trailing-edge direction is located closer to the trailing edge than the second film cooling holes (second film cooling hole array 54). Accordingly, in a trailing-edge-side region which is at least half of the high-density opening region $S_H$, heat input from the combustion gas side is reduced by the film boundary layer of the coolant formed by the second film cooling holes 55. Further, since the first film cooling holes 53 are disposed closer to the trailing edge than the second film cooling holes 55 in the leading-edge-to-trailing-edge direction, the cooling of the high-density opening region $S_H$ is further enhanced by the film cooling effect of the first film cooling holes 53 and the second film cooling holes 55.

Thus, since the second film cooling holes 55 are disposed closer to the leading edge 32 of the airfoil portion 42 than the first film cooling holes 53, it is possible to cool a wider region between the leading edge 32 and the trailing edge 34 of the airfoil portion 42 by the film boundary layer of the coolant, compared with the case where the second film cooling holes 55 are not provided. Thus, it is possible to more effectively suppress thermal damage to the airfoil portion 42.

On the other hand, the high-density opening region $S_H$ on the leading edge side (leading edge high-density opening region $S_{H1}$) of the position $X_{F2}$ of the second film cooling holes 55 in the leading-edge-to-trailing edge direction does not have the film cooling effect but has a higher density of the impingement cooling holes than on the trailing edge side (trailing edge high-density opening region $S_{H2}$) to enhance the cooling of the airfoil portion on the leading edge 32 side with a high heat load.

In the example shown in FIG. 8, the position $X_{S1}$ of the leading end defining the high-density opening region $S_H$ coincides with the leading edge 32. However, the position $X_{S1}$ of the leading end does not need to coincide with the leading edge 32, and may be located on the downstream side (trailing edge 34 side) of the leading edge 32 in the leading-edge-to-trailing-edge direction.

Figure 9:
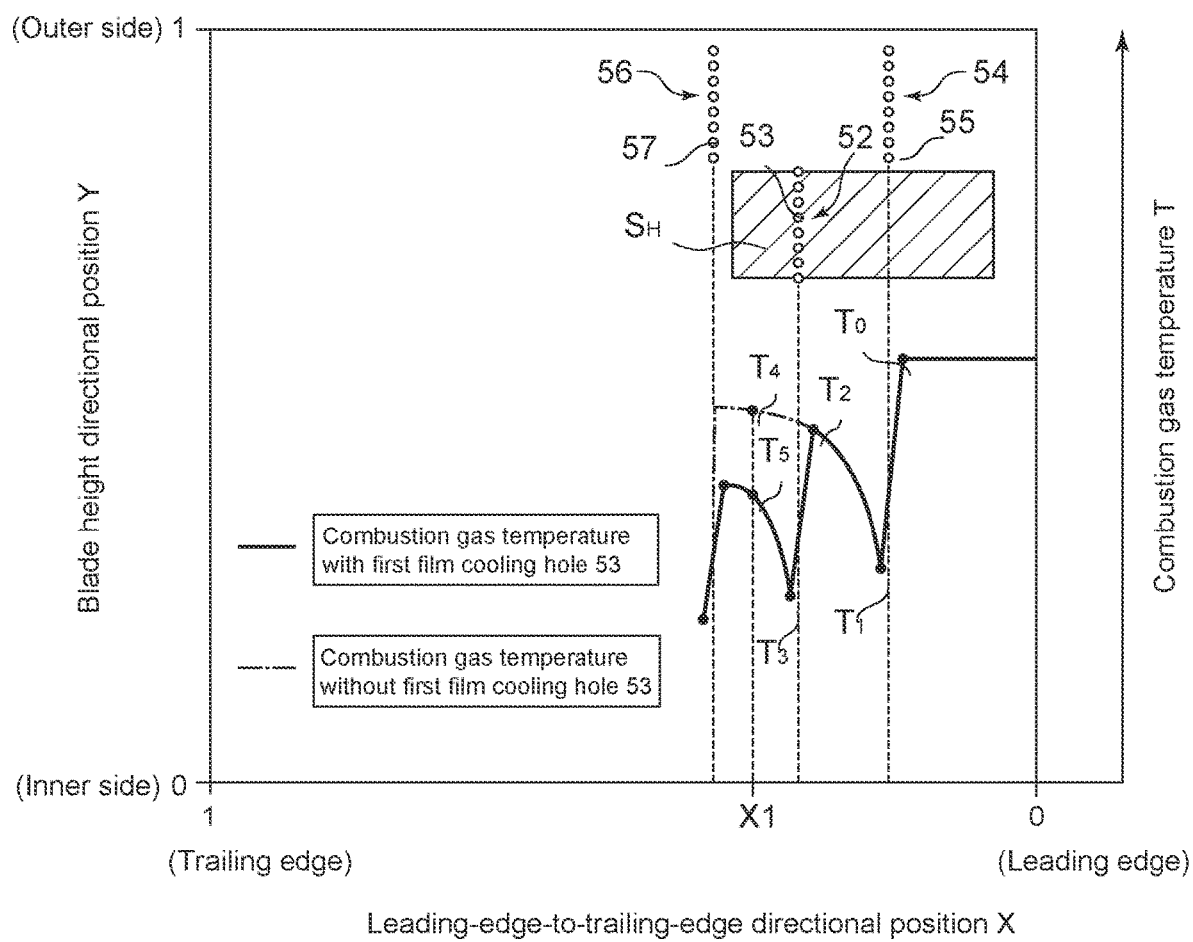
FIG. 9 is an explanatory diagram of an overlapping effect of film cooling.

Here, the overlapping effect of film cooling in the case where the second film cooling holes are provided closer to the leading edge than the first film cooling holes 53 will be described. FIG. 9 is an explanatory diagram of the overlapping effect of film cooling. The horizontal axis represents position X in the leading-edge-to-trailing-edge direction when the position of the leading edge 32 in the leading-edge-to-trailing-edge direction is 0, and the position of the trailing edge 34 in the leading-edge-to-trailing-edge direction is 1.

The left vertical axis of FIG. 9 represents position Y in the inner-end-to-outer-end direction (the radial direction of the rotor 8) when the position of the inner end 84 in the blade height direction is 0, and the position of the outer end 82 in the blade height direction is 1. The right vertical axis of FIG. 9 represents combustion gas temperature T.

In FIG. 9, the combustion gas flowing into the turbine blade from the upstream side with respect to the flow direction of the combustion gas contacts the leading edge 32 of the turbine blade at temperature $T_0$ and flows along the pressure surface 36 and the suction surface 38. The combustion gas that reaches the second film cooling hole array 54 contacts the coolant (air) discharged from the second film cooling holes 55 and is cooled to temperature $T_1$. Then, however, in the course of flowing down along the blade surface, the temperature gradually increases due to the influence of surrounding hot combustion gas. At the position of the first film cooling hole array 52, the temperature increases to $T_2$. Further, the combustion gas contacts the coolant discharged from the first film cooling holes 53 and is cooled to temperature $T_3$. The combustion gas having passed through the first film cooling hole array 52 is again heated due to the influence of surrounding hot combustion gas, and the temperature reaches $T_5$ at the position X1 closer to the trailing edge 34 than the first film cooling hole array 52.

On the other hand, when the first film cooling hole array 52 is not provided, the temperature $T_2$ of the combustion gas at the first film cooling hole array 52 is further increased and reaches $T_4$ at the position X1. In other words, temperature difference $[T_4-T_5]$ of the combustion gas is caused at the position X1 closer to the trailing edge 34 than the first film cooling hole array 52 by the presence or absence of the first film cooling hole array 52. That is, film cooling forms a boundary layer of the coolant between the combustion gas and the blade film and thereby prevents heat transfer from the combustion gas to the blade surface. Further, as described above, when the first film cooling hole array 52 is disposed on the downstream side of the second film cooling hole array 54 with respect to the flow direction of the combustion gas, the temperature of the combustion on the downstream side of the first film cooling hole array 52 is further decreased. That is, in the region downstream of the first film cooling hole array 52 such as the position X1, the temperature of the combustion gas is decreased from $T_4$ to $T_5$, so that heat transfer from the combustion gas to the blade surface is further reduced. Thus, in the region downstream of the first film cooling hole array 52, heat transfer from the combustion gas is further suppressed by the overlapping effect of film cooling.

Accordingly, in the high-density opening region $S_H$ in which the second film cooling hole array 54 is disposed closer to the leading edge than the first film cooling hole array 52, the overlapping effect of film cooling is cumulatively added to the impingement cooling effect by the impingement cooling holes 60 and the film cooling effect by the first film cooling hole array 52, so that a further cooling effect is produced in the high-density opening region $S_H$. Although in the example shown in FIG. 9, the upstream end of the high-density opening region $S_H$ does not coincide with the leading edge 32 and is located somewhat downstream, the upstream end may coincide with the leading edge 32 as shown in FIG. 8.

In some embodiments, as shown in FIG. 8, the second film cooling hole array 54 formed by the plurality of second film cooling holes 55 is formed over a blade height range including at least the first film cooling hole array 52 formed by the plurality of first film cooling holes 53. In other words, in the developed plan view of FIG. 8, a range $H_{Y1}$ in the blade height direction in which the plurality of first film cooling holes 53 constituting the first film cooling hole array 52 is formed is included in a range $H_{Y2}$ in the blade height direction in which the plurality of second film cooling holes 55 constituting the second film cooling hole array 54 is formed.

Thus, since the second film cooling hole array 54 is formed over a blade height range including at least the first film cooling hole array 52, it is possible to more effectively cool the airfoil portion at the position corresponding to the high-density opening region $S_H$ by the film of the coolant formed by the first film cooling holes 53 and the second film cooling holes 55.

In some embodiments, the plurality of third film cooling holes 57 is disposed closer to the trailing edge 34 of the airfoil portion 42 than the upstream film cooling holes (53, 55) in the blade surface (pressure surface 36 or suction surface 38) of the airfoil portion 42 corresponding to the surface (surface 72 or 74) of the insert 70 on which the high-density opening region $S_H$ of the impingement cooling holes 60 is formed.

For instance, in the exemplary embodiment shown in FIGS. 2 and 3, as described above, the high-density opening region $S_H$ of the impingement cooling holes 60 is formed on the surface 74 (see FIG. 3) of the insert 70 facing the inner wall surface 42A of the airfoil portion 42 on the suction surface 38 side. Further, the plurality of third film cooling holes 57 is disposed closer to the trailing edge 34 of the airfoil portion 42 than the plurality of first film cooling holes 53 in the suction surface 38 of the airfoil portion 42 corresponding to the surface 74.

Referring to the developed plan view of FIG. 8, in the airfoil portion 42 according to the developed plan view, when $X_{F3}$ is the position of the plurality of third film cooling holes 57 (i.e., the position of the third film cooling hole array) in the leading-edge-to-trailing-edge direction, the position $X_{F3}$ and the position $X_{F1}$ of the first film cooling holes 53 in the same direction satisfy a relationship of $X_{F1} \leq X_{F3}$. In other words, a distance from the leading edge 32 to the position $X_{F3}$ of the third film cooling holes 53 along the blade surface in the leading-edge-to-trailing-edge direction is longer than a distance from the leading edge 32 to the position $X_{F1}$ of the first film cooling holes 53 along the blade surface in the leading-edge-to-trailing-edge direction.

Thus, since the third film cooling holes 57 are disposed closer to the trailing edge 34 of the airfoil portion 42 than the first film cooling holes 53, it is possible to more effectively cool a portion closer to the trailing edge 34 of the airfoil portion 42 than the first film cooling holes 53. Thus, it is possible to more effectively suppress thermal damage to the airfoil portion 42.

In some embodiments, on the blade surface (e.g., suction surface 38) of the airfoil portion 42, when $L_{12}$ (see FIG. 8) is a distance between the first film cooling hole array 52 and the second film cooling hole array 54, and $L_{23}$ (see FIG. 8) is a distance between the second film cooling hole array 54 and the third film cooling hole array 56, the distance $L_{12}$ and the distance $L_{23}$ satisfy $0.3L_{23} \leq L_{12} \leq 0.5L_{23}$.

When the distance $L_{12}$ and the distance $L_{23}$ satisfy $0.3L_{23} \leq L_{12}$, the first film cooling hole array 52 is disposed closer to the trailing edge 34 where the pressure in the combustion gas passage 28 (see FIG. 1) is relatively low. Thus, it is possible to easily ensure the differential pressure across the impingement cooling holes 60. Further, when the distance $L_{12}$ and the distance $L_{23}$ satisfy $L_{12} \leq 0.5L_{23}$, the first film cooling hole array 52 is disposed relatively close to the leading edge 32. Thus, it is possible to cool a relatively wide region between the leading edge 32 and the trailing edge 34 by the film formed by the first film cooling holes 53.

Consequently, it is possible to effectively suppress thermal damage to the airfoil portion 42 at the position corresponding to the high-density opening region $S_H$ of the insert 70.

In some embodiments, on the blade surface (e.g., suction surface 38) of the airfoil portion 42, when $L^*$ is distance between the leading end (position $X_{S1}$ in the leading-edge-to-trailing-edge direction) and the trailing end (position $X_{S2}$ in the leading-edge-to-trailing-edge direction) of the high-density opening region $S_H$, and $L_1^*$ is distance between the first film cooling hole array 52 and the leading end of the high-density opening region $S_H$, the distance $L^*$ and the distance $L_1^*$ satisfy $0.3L^* \leq L_1^* \leq 0.7L^*$.

When the distance $L^*$ and the distance $L_1^*$ satisfy $0.3L^* \leq L_1^*$, the first film cooling hole array 52 is disposed closer to the trailing edge 34 where the pressure in the combustion gas passage 28 (see FIG. 1) is relatively low. Thus, it is possible to easily ensure the differential pressure across the impingement cooling holes 60. Further, when the distance $L^*$ and the distance $L_1^*$ satisfy $L_1^* \leq 0.7L^*$, the first film cooling hole array 52 is disposed relatively close to the leading edge 32. Thus, it is possible to cool a relatively wide region between the leading edge 32 and the trailing edge 34 by the film formed by the first film cooling holes 53.

Consequently, it is possible to effectively suppress thermal damage to the airfoil portion 42 at the position corresponding to the high-density opening region $S_H$ of the insert 70.

Depending on the coating separation state and the operational condition of the gas turbine, the formation range of the high-density opening region $S_H$ in the leading-edge-to-trailing-edge direction may be extended from the leading edge region 33 to the vicinity of the third film cooling holes 57 (third film cooling hole array 56) along the suction-side blade surface. As a result, it is possible to enhance the cooling over a wide range on the suction surface 38 in the leading-edge-to-trailing-edge direction.

Figure 10:
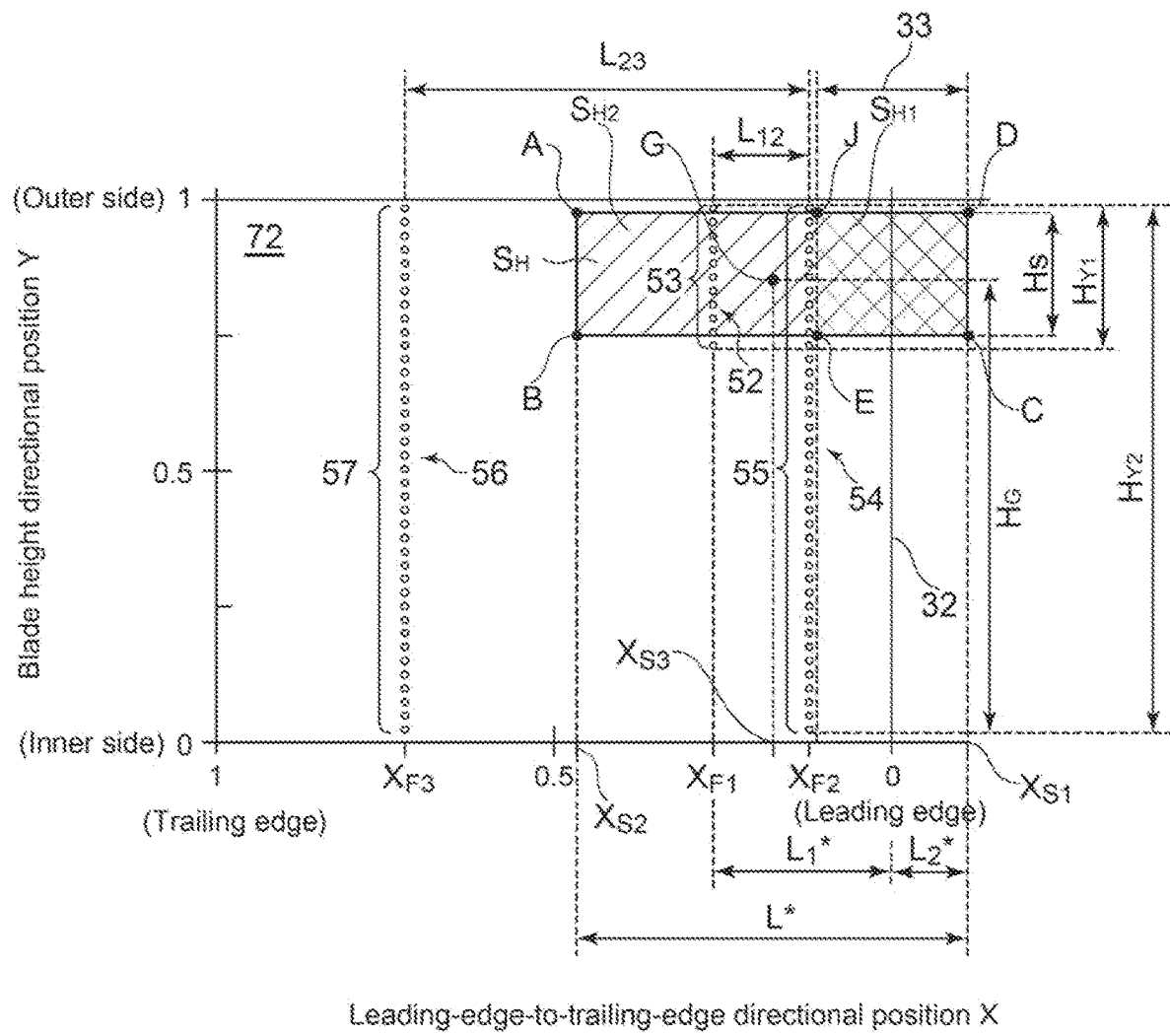
FIG. 10 is a graph schematically showing a developed plan view of a suction surface of an airfoil portion of a turbine rotor blade according to an embodiment.

Next, another embodiment of the high-density opening region $S_H$ will be described with reference to FIG. 10. In this embodiment, starting from the embodiment shown in FIG. 8, the formation range of the high-density opening region $S_H$ is extended across the leading edge 32 to the pressure-side end 33a to enhance the cooling of the leading edge region 33. In the embodiment shown in FIG. 10, the position $X_{S1}$ of the leading end of the high-density opening region $S_H$ in the leading-edge-to-trailing-edge direction is further extended from the position of the leading edge 32 to the pressure-side end 33a on the pressure surface 36 side. As shown in FIG. 10, the high-density opening region $S_H$ in this embodiment is represented by a rectangular region (region ABCD) surrounded by the dots ABCD. A range in which the high-density opening region $S_H$ is formed extends from the position $X_{S2}$ of the trailing end on the suction surface 38 side on the blade surface of the airfoil portion across the leading edge 32 to the position $X_{S1}$ of the leading end formed on the pressure surface 36 side on the blade surface. In other words, compared with the structure shown in FIG. 8, in this structure, the position of the side CD is shifted further toward the pressure surface 36 across the leading edge 32, and the region including a high density of the impingement cooling holes 60 is enlarged toward the pressure surface 36 to enhance the cooling of the leading edge region 33. The combustion gas directly contacts the leading edge region 33 and flows along the blade surface. Accordingly, the blade surface of the leading edge region 33 in direct contact with the combustion gas is exposed to a high temperature atmosphere, has a high heat transfer rate, and is thus easily heated. Further, separation of the thermal barrier coating occurring in the vicinity of the leading edge 32 of the leading edge region 33 may expand from the occurrence position to the pressure surface 36 side and the suction surface 38 side with the elapsed time of operation. Accordingly, as shown in FIG. 10, impingement cooling may also be enhanced on the blade surface on the pressure surface 36 side in the leading edge region 33.

As shown in FIG. 10, the position of the central position (geometric center G) of the region ABCD defining the high-density opening region $S_H$ in the leading-edge-to-trailing-edge direction is halfway between the position $X_{S1}$ of the leading end and the position $X_{S2}$ of the trailing end defining the high-density opening region $S_H$, and coincides with the position of the midpoint of the side AD or the side BC. Further, the position of the geometric center G in the blade height direction is halfway between the outer end and the inner end defining the high-density opening region $S_H$ and coincides with the position of the midpoint of the side AB or the side CD. In other words, when the high-density opening region $S_H$ is regarded as one figure, the geometric center G is the center of the figure (i.e., centroid) defined by the region ABCD. The geometric center G coincides with the midpoint in the leading-edge-to-trailing-edge direction and the midpoint in the blade height direction in the high-density opening region $S_H$.

Also in this embodiment, like the embodiment shown in FIG. 8, the high-density opening region $S_H$ includes a leading edge high-density opening region $S_{H1}$ formed in the leading edge region 33, and a trailing edge high-density opening region S2 adjoining the leading edge high-density opening region $S_{H1}$ in the leading-edge-to-trailing-edge direction and formed closer to the trailing edge 34. More specifically, the leading edge high-density opening region $S_{H1}$ is formed over the substantially entire width of the leading edge region 33 in the leading-edge-to-trailing-edge direction across the leading edge 32, and is represented by a rectangular region (region DCEJ) surrounded by the dots DCEJ. Further, the trailing edge high-density opening region $S_{H2}$ spreads over a range substantially equal to the adjoining leading edge high-density opening region $S_{H1}$ in the blade height direction and is represented by a rectangular region (region ABEJ) surrounded by the dots ABEJ. The opening density of the leading edge high-density opening region $S_{H1}$ is higher than the opening density of the trailing edge high-density opening region $S_{H2}$. The side EJ forming a boundary between the leading edge high-density opening region $S_{H1}$ and the trailing edge high-density opening region $S_{H2}$ coincides with the position of the suction-side end 33b. The side EJ is a boundary line extending in the blade height direction along the second film cooling holes 55 (second film cooling hole array 54).

The position of the first film cooling holes 53, the second film cooling holes 55, and the third film cooling holes 57 on the blade surface, the positional relationship between the film cooling holes, and the positional relationship with the high-density opening region $S_H$ are the same as the embodiment shown in FIG. 8. The operation and the effect of the film cooling holes are also the same.

Further, also in this embodiment, the midpoint of the high-density opening region $S_H$ in the leading-edge-to-trailing-edge direction is located closer to the trailing edge than the second film cooling holes (second film cooling hole array 54). Accordingly, in a trailing-edge-side region which is at least half of the high-density opening region $S_H$, heat input from the combustion gas side is reduced by the film boundary layer of the coolant formed by the second film cooling holes 55. Further, the first film cooling holes 53 are disposed closer to the trailing edge than the second film cooling holes 55 in the leading-edge-to-trailing-edge direction. Accordingly, in the high-density opening region $S_H$ on the trailing edge side of the position $X_{F1}$ of the first film cooling holes 53, the cooling of the airfoil portion is further enhanced by the overlapping effect of film cooling of the first film cooling holes 53 and the second film cooling holes 55.

On the other hand, the high-density opening region $S_H$ on the leading edge side (leading edge high-density opening region $S_{H1}$) of the position $X_{F2}$ of the second film cooling holes 55 in the leading-edge-to-trailing edge direction does not have the film cooling effect but has a higher density of the impingement cooling holes than on the trailing edge side (trailing edge high-density opening region $S_{H2}$) to enhance the cooling of the airfoil portion.

Also in this embodiment, in the region closer to the trailing edge than the second film cooling holes 55 in the leading-edge-to-trailing-edge direction, the cooling effect of the film boundary layer formed so as to cover the high-density opening region $S_H$ is cumulatively added to the impingement cooling effect by the provision of the first film cooling holes 53 and the second film cooling holes 55, so that cooling is further enhanced in the high-density opening region $S_H$. Further, since the high-density opening region $S_H$ (leading edge high-density opening region $S_{H1}$) formed in the leading edge region 33 closer to the leading edge than the second film cooling holes 55 in the leading-edge-to-trailing-edge direction has a higher density of the impingement cooling holes 60 than the trailing edge high-density opening region $S_{H2}$ formed on the trailing edge 34 side, impingement cooling is enhanced, and thermal damage to the airfoil portion 42 in the vicinity of the leading edge region 33 with a high heat load is further suppressed.

Further, since the second film cooling hole array 54 is formed over a blade height range including at least the first film cooling hole array 52, it is possible to more effectively cool the airfoil portion at the position corresponding to the high-density opening region $S_H$ by the overlapping effect of film cooling of the coolant formed by the first film cooling holes 53 and the second film cooling holes 55.

Figure 11:
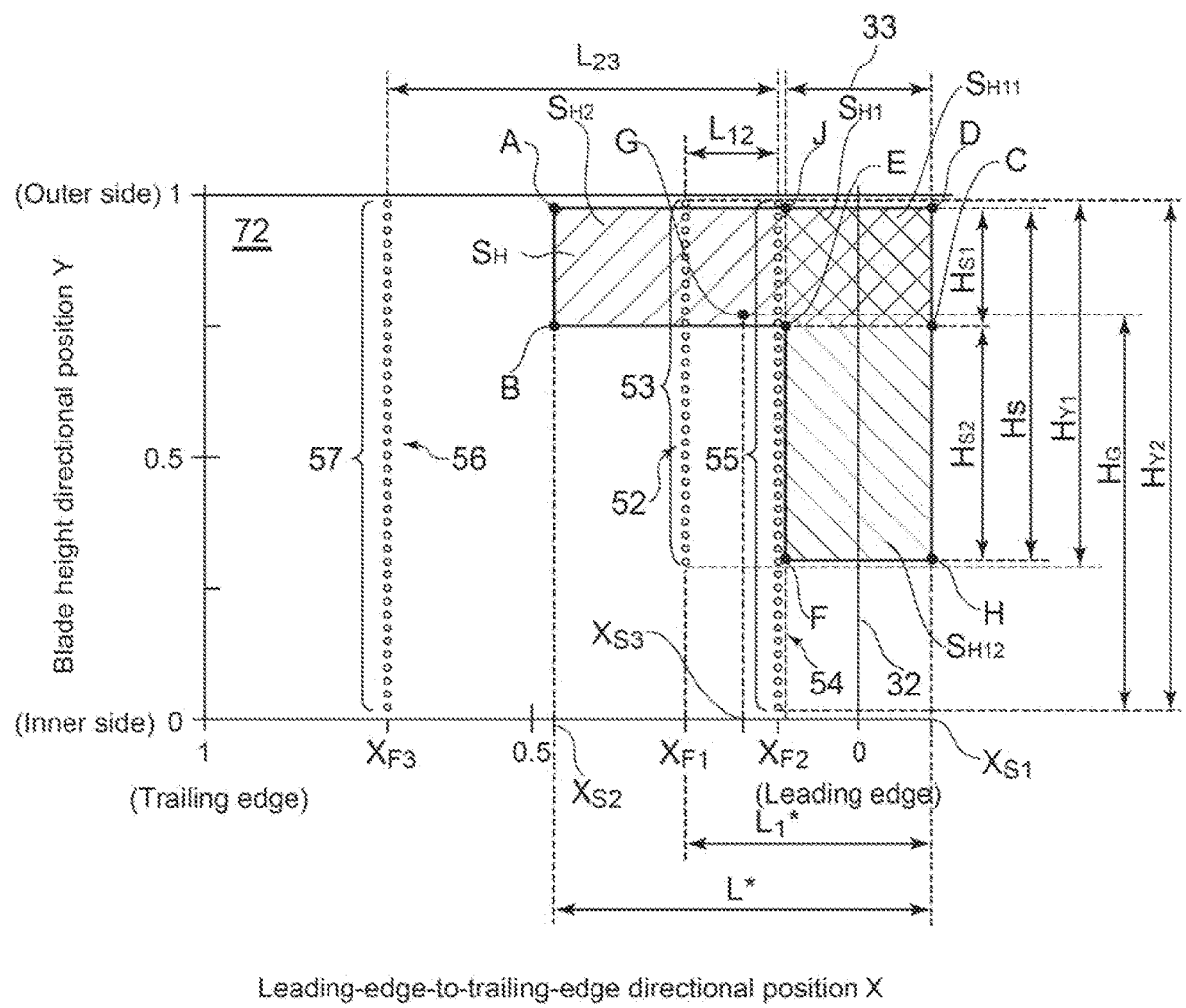
FIG. 11 is a graph schematically showing a developed plan view of a suction surface of an airfoil portion of a turbine blade according to an embodiment.

Next, another embodiment of the high-density opening region $S_H$ will be described with reference to FIG. 11. In this embodiment, starting from the embodiment shown in FIG. 10, the cooling effect in an inner region of the leading edge region 33 with respect to the blade height direction is further enhanced. FIG. 11 shows the case where a region of the high-density opening region $S_H$ included in the leading edge region 33 is extended inward in the blade height direction. As shown in FIG. 11, the high-density opening region $S_H$ in this embodiment is represented by a polygonal region (region ABEFHD) surrounded by the dots ABEFHD. In contrast to the region ABCD extending in the leading-edge-to-trailing-edge direction shown in FIG. 10, this region is bent inward in the blade direction at right angle with a width of the side CE included in the leading edge region 33 in the side BC, and the high-density opening region $S_H$ is enlarged to the side FH. The high-density opening region $S_H$ is formed in an L-shaped polygonal shape as a whole to further enhance the cooling effect of the leading edge region 33 with a high load, compared with the embodiment shown in FIG. 10.

When the region ABCD is referred to as an upper region $S_{HU}$, and the region EFHC is referred to as a lower region $S_{HD}$, the upper region $S_{HU}$ composed of the region ABCD is a region extending from the suction side to the pressure side in the leading-edge-to-trailing-edge direction in an elongated rectangular shape, and the lower region $S_{HD}$ composed of the region EFHC is a region extending in the blade height direction in an elongated rectangular shape in the leading edge region 33. In other words, the region ABEFHD shown in FIG. 11 includes the upper region $S_{HU}$ and the lower region $S_{HD}$, and is formed in an L-shaped polygon as a whole. In this embodiment, the position $X_{S1}$ of a leading end of the upper region $S_{HU}$ defining the position of the upper region $S_{HU}$ in the leading-edge-to-trailing-edge direction is the side DC, and the position $X_{S2}$ of a trailing end thereof is the side AB. Further, an outer end of the upper region $S_{HU}$ defining the position of the upper region $S_{HU}$ in the blade height direction is the side AD, and an inner end thereof is the side BEC. Further, a leading end of the lower region $S_{HD}$ defining the position of the lower region $S_{HD}$ in the leading-edge-to-trailing-edge direction is the side CH, which coincides with the side DC at the position $X_{S1}$ in the leading-edge-to-trailing-edge direction. A trailing end thereof is the side EF, which coincides with the suction-side end 33b in the leading-edge-to-trailing-edge direction. Further, an outer end of the lower region $S_{HD}$ defining the position of the lower region $S_{HD}$ in the blade height direction is the side EC, and an inner end thereof is the side FH. Accordingly, a leading end of the region ABEFHD is represented by the side DH. Further, the range of the upper region $S_{HU}$ in the blade height direction is represented by $H_{S1}$, and the range of the lower region $S_{HD}$ in the blade height direction is represented by $H_{S2}$. The range of the side DH in the blade height direction defining the leading ends of the upper region $S_{HU}$ and the lower region $S_{HD}$ coupled via the side CE is represented by $H_S$. Further, the geometric center G of the region ABEFHD is the center of the figure of the high-density opening region $S_H$ in an L-shape combining the upper region $S_{HU}$ and the lower region $S_{HD}$.

Further, the high-density opening region $S_H$ in this embodiment is composed of the leading edge high-density opening region $S_{H1}$ which is an elongated rectangular region (region DHFJ) surrounded by the dots DHFJ and extending inward in the blade height direction and the trailing edge high-density opening region $S_{H2}$ which is an elongated rectangular region (region ABEJ) surrounded by the dots ABEJ and extending toward the trailing edge 34 in the leading-edge-to-trailing-edge direction. More specifically, the leading edge high-density opening region $S_{H1}$ is formed over the substantially entire width of the leading edge region 33 in the leading-edge-to-trailing-edge direction across the leading edge 32, and is represented by the region DCEJ extending inward in the blade height direction. Further, the trailing edge high-density opening region $S_{H2}$ spreads over a blade height range substantially equal to the region DHFJ, which extends on the outermost side with respect to the blade height direction in the adjoining leading edge high-density opening region $S_{H1}$, and is represented by the rectangular region ABEJ extending toward the trailing edge 34. The opening density of the leading edge high-density opening region $S_{H1}$ is higher than the opening density of the trailing edge high-density opening region $S_{H2}$. The side EJ forming a boundary between the leading edge high-density opening region $S_{H1}$ and the trailing edge high-density opening region $S_{H2}$ coincides with the position of the suction-side end 33b. The side EJ is a boundary line extending in the blade height direction along the second film cooling holes 55 (second film cooling hole array 54).

Further, the leading edge high-density opening region $S_{H1}$ in this embodiment is composed of an outer leading edge high-density opening region $S_{H11}$ (fourth high-density opening region) which is a rectangular region (region DCEJ) surrounded by the dots DCEJ, formed on the outer side in the blade height direction, and extending in the leading-edge-to-trailing-edge direction, and an inner leading edge high-density opening region $S_{H12}$ (fifth high-density opening region) which is a rectangular region surrounded by the dots CHFE, adjoining the outer leading edge high-density opening region $S_{H11}$ via the side CE, and extending inward in the blade height direction from the side CE. Further, the opening density of the outer leading edge high-density opening region $S_{H11}$ is higher than the opening density of the inner leading edge high-density opening region $S_{H12}$. Further, the opening density of the inner leading edge high-density opening region $S_{H12}$ is higher than the opening density of the trailing edge high-density opening region $S_{H2}$. Accordingly, in this embodiment, the region having the highest opening density is the outer leading edge high-density opening region $S_{H11}$, followed by, in descending order, the inner leading edge high-density opening region $S_{H12}$ and the trailing edge high-density opening region $S_{H2}$ (outer leading edge high-density opening region $S_{H11}$>inner leading edge high-density opening region $S_{H12}$>trailing edge high-density opening region $S_{H2}$).

The position of the first film cooling holes 53, the second film cooling holes 55, and the third film cooling holes 57 on the blade surface, the positional relationship between the film cooling holes, and the positional relationship with the high-density opening region $S_H$ are basically the same as the embodiments shown in FIGS. 8 and 10.

In addition, in terms of cooling enhancement in the leading edge region 33 with a high heat load, the region DCEJ which is a part of the upper region $S_{HU}$ included in the leading edge region 33 and the region CHFE forming the lower region HD together forms one leading edge high-density opening region $S_{H1}$ as a whole, which has a higher opening density than the trailing edge high-density opening region $S_{H2}$. Further, in the leading edge region 33, the region DCEJ located on the outer side in the blade height direction more easily causes separation of the coating and tends to be subjected to a higher heat load than the region CHFE located on the inner side in the blade height direction. To enhance the cooling of the outer part of the leading edge region 33, the region DCEJ is formed as the outer leading edge high-density opening region $S_{H11}$, having a higher opening density than the inner leading edge high-density opening region $S_{H12}$. Although the leading edge region 33 cannot have the film cooling effect of the second film cooling holes 55, the cooling of the leading edge region 33 is enhanced by the above configuration regarding the opening density of the impingement cooling holes 60, so that thermal damage to the airfoil portion 42 in the leading edge region 33 is suppressed.

The range of the lower region $S_{HD}$ in the blade height direction is selected by the metal temperature of the blade surface in the leading edge region 33. The upper limit position, with respect to the blade height direction, of the side FH defining the inner end of the lower region $S_{HD}$ is the side CE, and the lower limit position may be at the inner end 84.

Further, in the case of the embodiment shown in FIG. 10, the range $H_{Y1}$ in which the first film cooling holes 53 are disposed in the blade height direction may be slightly wider than the range $H_S$ in which the high-density opening region $S_H$ extending in the leading-edge-to-trailing-edge direction is disposed by the length of one hole on each side in the blade height direction. On the other hand, in the case of the embodiment shown in FIG. 11, the region ABEFHD forming the high-density opening region $S_H$ has an L-shaped polygonal shape. Accordingly, the range in which the first film cooling holes 53 are disposed in the blade height direction may be wider than in the embodiment shown in FIG. 10 within the region forming the high-density opening region $S_H$. In other words, the range in which the first film cooling holes 53 are disposed may include the range $H_S$ of the side DH defining the leading end of the high-density opening region $S_H$ in the blade height direction, and may be wider than the range $H_S$, for instance, by the length of one hole in the blade height direction. However, depending on the position of the impingement cooling holes in the high-density opening region $S_H$, the formation range of the first film cooling holes 53 in the blade height direction may be shortened so that the total opening area of the impingement cooling holes in the high-density opening region $S_H$ is substantially equal to the total flow-path cross-sectional area of the first film cooling holes 53. That is, the hole diameter and the hole pitch of the first film cooling holes 53 may be changed so that the hole formation range includes the range $H_{S1}$ of the side AB in the blade height direction and is made relatively short to the extent wider than the range $H_{S1}$ by the length of one hole on each side in the blade height direction.

Although the high-density opening region $S_H$ in this embodiment is a polygonal region (region ABEFHD), the center of the entire region is the geometric center G.

Further, the position of the geometric center G of the high-density opening region $S_H$ in the leading-edge-to-trailing-edge direction is on the suction surface 38 side. The position of the geometric center G of the entire high-density opening region $S_H$ in the blade height direction is located on the outer side of the midpoint of the airfoil portion 42 in the blade height direction. Here, the midpoint of the leading edge high-density opening region $S_{H1}$ disposed in the leading edge region 33 in the blade height direction may coincide with the midpoint of the airfoil portion 42 in the blade height direction or may be located on the outer side of this position in the blade height direction.

According to this embodiment, as in some embodiments, the high-density opening region $S_H$ is formed at the position corresponding to the blade surface where separation of the coating is likely to occur so that the opening density of the impingement cooling holes 60 in this region is higher than in the other regions. Thus, the cooling of the airfoil portion 42 is enhanced, and thermal damage is suppressed. Further, since the opening density of the leading edge high-density opening region $S_{H1}$ in the leading edge region 33 is higher than the opening density of the other regions including the trailing edge high-density opening region $S_{H2}$, it is possible to further suppress thermal damage to the leading edge region 33 of the airfoil portion 42.

Further, the region DCEJ included in the leading edge region 33 and located on the outer side in the blade height direction in the leading edge region 33 of the airfoil portion 42, particularly, on the outer side of the midpoint in the blade height direction includes the outer leading edge high-density opening region $S_{H11}$, where separation of the coating is likely to occur. Therefore, in this region, the opening density of the impingement cooling is made the highest on the suction-side blade surface. Thus, the cooling in the outer region with respect to the blade height direction in the leading edge region 33 with a high heat load is enhanced. Further, the inner leading edge high-density opening region $S_{H12}$ adjoining an inner end of the outer leading edge high-density opening region $S_{H11}$ in the blade height direction has a lower opening density than the outer leading edge high-density opening region $S_{H11}$ but has a higher opening density than the trailing edge high-density opening region $S_{H2}$. Thus, the cooling of the region CHFE on the inner side in the leading edge region 33 of the airfoil portion 42 in the blade height direction, which has a high heat transfer rate and tends to be heated, is enhanced.

Further, also in this embodiment, the position of the geometric center G of the high-density opening region $S_H$ in the leading-edge-to-trailing-edge direction is located closer to the trailing edge than the second film cooling holes (second film cooling hole array 54) like the embodiments shown in FIGS. 8 and 10. Accordingly, in a trailing-edge-side region which is at least half of the high-density opening region $S_H$, heat input from the combustion gas side is reduced by the film boundary layer of the coolant formed by the second film cooling holes 55. Further, the first film cooling holes 53 are disposed closer to the trailing edge than the second film cooling holes 55 in the leading-edge-to-trailing-edge direction. Accordingly, in the high-density opening region $S_H$ on the trailing edge side of position $X_{F1}$ of the first film cooling holes 53, the cooling of the airfoil portion is further enhanced by the overlapping effect of film cooling of the first film cooling holes 53 and the second film cooling holes 55.

Thus, since the second film cooling hole array 54 is formed over a blade height range including at least the first film cooling hole array 52, it is possible to more effectively cool the airfoil portion at the position corresponding to the high-density opening region $S_H$ by the film of the coolant formed by the first film cooling holes 53 and the second film cooling holes 55.

Next, another embodiment will be described with reference to FIG. 12. In this embodiment, in contrast to the embodiments shown in FIGS. 8 and 10, the first film cooling holes 53 are not provided. Compared with the embodiment shown in FIG. 10, if the hot gas or particles in the gas less frequently impinge and the coating only slightly separates from the blade surface of the turbine blade, the first film cooling holes 53 may not be provided although the high-density opening region $S_H$ is provided. Further, in the case where the coating only slightly separates, the opening density of the impingement cooling holes 60 in the high-density opening region $S_H$ may be lower than the opening density in the embodiments shown in FIGS. 8 and 10.

Figure 12:
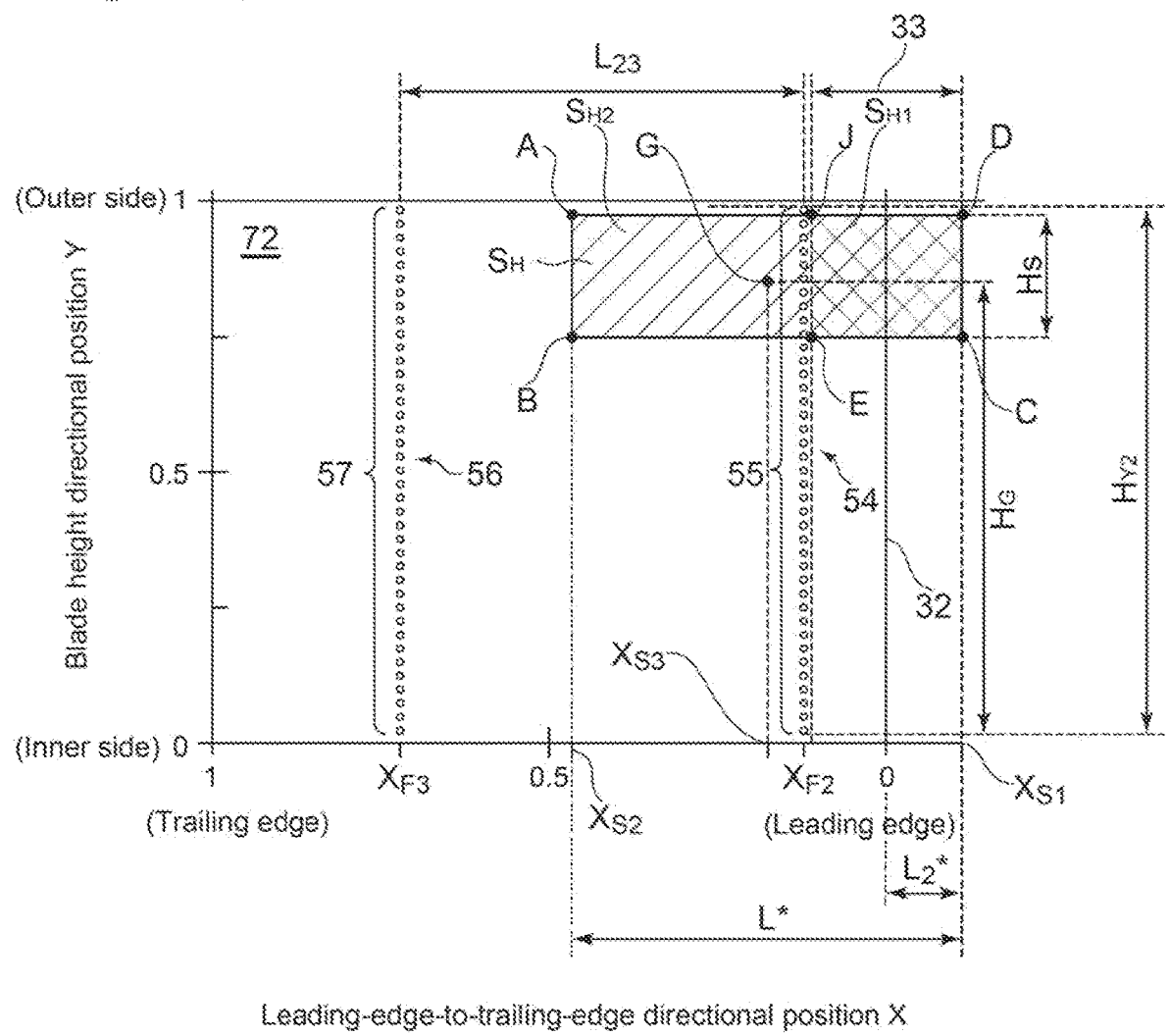
FIG. 12 is a graph schematically showing a developed plan view of a suction surface of an airfoil portion of a turbine rotor blade according to an embodiment.

That is, the embodiment shown in FIG. 12 differs from the embodiment shown in FIG. 10 in that the first film cooling holes 53 (first film cooling hole array 52) are not provided, and the average opening density of the entire high-density opening region $S_H$ is lower and smaller than the average opening density of the high-density opening region $S_H$ in the embodiments shown in FIGS. 8 and 10. The position and the range in the leading-edge-to-trailing-edge direction in which the high-density opening region $S_H$ is disposed in the insert 70, and the position and the range in the blade height direction in which the high-density opening region $S_H$ is disposed are the same as the high-density opening region $S_H$ in the embodiment shown in FIG. 10. The configuration is otherwise the same as that of the embodiment shown in FIG. 10 unless particularly stated. The same components as those in the embodiment shown in FIG. 10 are associated with the same reference numerals and terms and not described in detail.

The high-density opening region $S_H$ in the embodiment shown in FIG. 12 is represented by the region ABCD elongated in the leading-edge-to-trailing-edge direction. The position $X_{S1}$ of a leading end of the high-density opening region $S_H$, closer to the leading edge 32, is the side DC and coincides with the position of the pressure-side end 33a. Further, the position $X_{S2}$ of a trailing end of the high-density opening region $S_H$ is the side AB. When the high-density opening region $S_H$ is regarded as on figure, the geometric center G is the center of the figure defined by the region ABCD and coincides with the midpoint of the high-density opening region $S_H$ in the leading-edge-to-trailing-edge direction and in the blade height direction of the airfoil portion 42.

Also in this embodiment, like the embodiments shown in FIGS. 8 and 10, the high-density opening region $S_H$ includes a leading edge high-density opening region $S_{H1}$ formed in the leading edge region 33, and a trailing edge high-density opening region $S_{H2}$ adjoining the leading edge high-density opening region $S_{H1}$ in the leading-edge-to-trailing-edge direction and formed closer to the trailing edge 34. The opening density of the impingement cooling holes 60 of the leading edge high-density opening region $S_{H1}$ is higher than the opening density of the trailing edge high-density opening region $S_{H2}$. However, the opening density of the leading edge high-density opening region $S_{H1}$ in the embodiment shown in FIG. 12 is lower than the opening density of the leading edge high-density opening region $S_{H1}$ in the embodiments shown in FIGS. 8 and 10. On the other hand, the opening density of the trailing edge high-density opening region $S_{H2}$ may be the same as the opening density of the leading edge high-density opening region $S_{H1}$ in the embodiments shown in FIGS. 8 and 10. In other words, when comparing the average opening density of the high-density opening region $S_H$, the opening density of the embodiment shown in FIG. 12 may be lower than the opening density of the embodiments shown in FIGS. 8 and 10.

As described above, in this embodiment, although the first film cooling holes 53 does not exist, the position of the second film cooling holes 55 and the third film cooling holes 57 on the blade surface, the positional relationship between the film cooling holes, and the positional relationship with the high-density opening region $S_H$ are basically the same as the embodiments shown in FIGS. 8 and 10. That is, the plurality of second film cooling holes 55 is disposed along the suction-side end 33b, and the plurality of third film cooling holes 57 is disposed closer to the trailing edge 34 than the second film cooling holes 55 and the high-density opening region $S_H$.

The configuration of the film cooling holes in this embodiment also exhibits the film cooling effect. More specifically, the second film cooling holes 55 (second film cooling hole array 54) are formed over a range from the outer end 82 to the inner end 84 on the blade surface in the blade height direction along the suction-side end 33b of the leading edge region 33. As shown in FIG. 9, the combustion gas that reaches the second film cooling hole array 54 contacts the coolant discharged from the second film cooling holes 55 and is cooled from temperature $T_0$ to temperature $T_1$. Then, in the course of flowing down along the blade surface, the combustion gas reaches the position $X_{F3}$ of the third film cooling holes 57 (third film cooling hole array 56) while gradually increasing temperature. In this embodiment, since the first film cooling holes 53 (first film cooling hole array 52) does not exist, the combustion gas temperature does not decrease at the position of the first film cooling holes 53 but continuously increases. At the position $X_{F3}$ of the third film cooling holes 57, the combustion gas temperature reaches $T_6$. However, the combustion gas temperature $T_6$ is lower than the combustion gas temperature $T_0$ before the second film cooling holes 55. That is, the film boundary layer of the coolant formed by the second film cooling holes 55 reduces heat input from the combustion gas to the blade surface in a region downstream of the position $X_{F2}$ of the second film cooling holes 55.

According to the embodiment shown in FIG. 12, as in some embodiments, the high-density opening region $S_H$ is formed at the position corresponding to the blade surface where separation of the coating is likely to occur so that the opening density of the impingement cooling holes 60 in this region is higher than in the other regions. Thus, the cooling of the airfoil portion 42 is enhanced, and thermal damage is suppressed. Further, since the opening density of the leading edge high-density opening region $S_{H1}$ in the leading edge region 33 is higher than the opening density of the other regions including the trailing edge high-density opening region $S_{H2}$, it is possible to further suppress thermal damage to the leading edge region 33 of the airfoil portion 42, compared with some of other embodiments. On the other hand, although the opening density of the trailing edge high-density opening region $S_{H2}$ is lower than the opening density of the leading edge high-density opening region $S_{H1}$, the impingement cooling effect of the trailing edge high-density opening region $S_{H2}$ and the film cooling effect of the second film cooling holes 55 act cumulatively, so that thermal damage to the blade surface downstream of the second film cooling holes 55 is suppressed.

In this embodiment, the first film cooling holes 53 (first film cooling hole array 52) are not provided. Compared with FIGS. 8, 10, and 11, if the hot gas or particles in the gas less frequently impinge and the coating only slightly separates from the blade surface of the turbine blade, the separation does not proceed from the coating separated portion due to heat input from the combustion gas. Therefore, even if the impingement cooling effect in the outer region with respect to the blade height direction in the leading edge region 33 and the film cooling effect by the first film cooling holes 53 are weakened, thermal damage to the airfoil portion 42 can be suppressed.

Further, also in this embodiment, the position of the geometric center G of the high-density opening region $S_H$ in the leading-edge-to-trailing-edge direction is located closer to the trailing edge than the second film cooling holes (second film cooling hole array 54) like the embodiments shown in FIGS. 8, 10, and 11. Accordingly, in a trailing-edge-side region which is at least half of the high-density opening region $S_H$, heat input from the combustion gas side is reduced by the film boundary layer of the coolant formed by the second film cooling holes 55.

Next, another embodiment will be described with reference to FIG. 13. In the embodiment shown in FIG. 13, starting from the embodiment shown in FIG. 12, a region of the high-density opening region $S_H$ included in the leading edge region 33 is extended inward in the blade height direction like the embodiment shown in FIG. 11. More specifically, in the embodiment shown in FIG. 13, the leading edge high-density opening region $S_{H1}$ is formed by an upper region $S_{HU}$, which is a region of the high-density opening region $S_H$ included in the leading edge region 33, and a lower region $S_{HD}$, which is disposed on the radially inner side in the blade height direction so as to adjoin the upper region $S_{HU}$. The configuration of the trailing edge high-density opening region $S_{H2}$ is the same as the embodiments shown in FIGS. 8, 10, 11, and 12.

Figure 13:
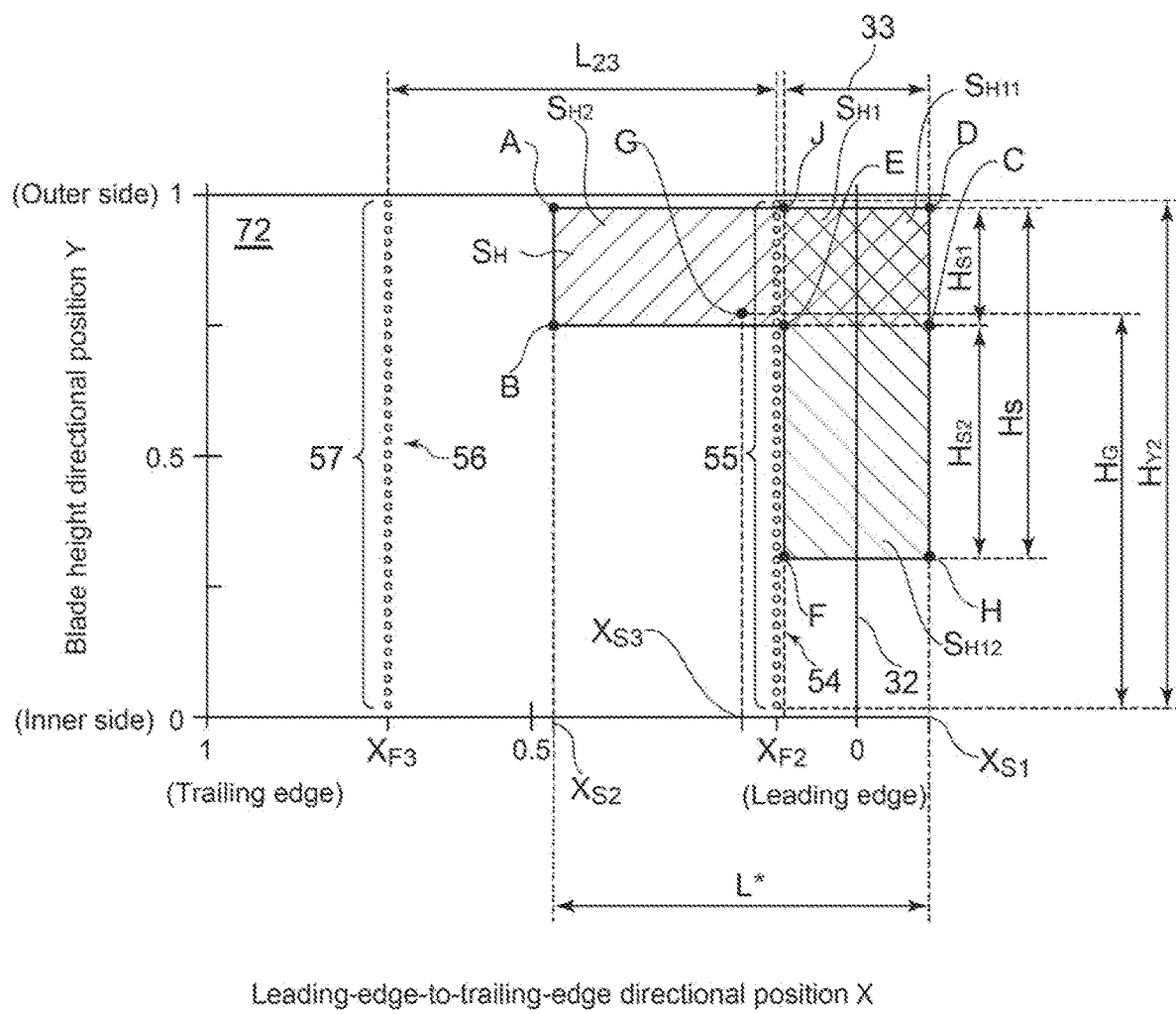
FIG. 13 is a graph schematically showing a developed plan view of a suction surface of an airfoil portion of a turbine rotor blade according to an embodiment.

The embodiment shown in FIG. 13 differs from the embodiment shown in FIG. 11 in that the first film cooling holes 53 (first film cooling hole array 52) are not provided, and the average opening density of the high-density opening region $S_H$ is lower. The configuration is otherwise the same as that of the embodiments shown in FIGS. 8, 10, and 11. The main difference from the embodiment shown in FIG. 12 is as described above.

In the embodiment shown in FIG. 13, although the first film cooling holes 53 does not exist, the position of the second film cooling holes 55 and the third film cooling holes 57 on the blade surface, the positional relationship between the film cooling holes, and the positional relationship with the high-density opening region $S_H$ are the same as the embodiments shown in FIGS. 8, 10, 11, and 12 with an exception below.

Specifically, the high-density opening region $S_H$ in the embodiment shown in FIG. 13 is an L-shaped polygonal region (region ABEFHD) like the embodiment shown in FIG. 11. A region (region DHFJ) of the high-density opening region $S_H$ included in the leading edge region 33 forms the leading edge high-density opening region $S_{H1}$. A part of the high-density opening region $S_H$ between the trailing edge 34 and the suction-side end 33b in the leading-edge-to-trailing-edge direction forms the trailing edge high-density opening region $S_{H2}$. Further, the leading edge high-density opening region $S_{H1}$ includes the outer leading edge high-density opening region $S_{H11}$ disposed on the outer side in the blade height direction and the inner leading edge high-density opening region $S_{H12}$ disposed on the inner side in the blade height direction. The position of ends of the outer leading edge high-density opening region $S_{H11}$ and the inner leading edge high-density opening region $S_{H12}$ closer to the trailing edge 34 in the leading-edge-to-trailing-edge direction coincides with the position of the suction-side end 33b and coincides with the position of the second film cooling holes 55 (second film cooling hole array 54) close to the leading edge 32 in the vicinity of the position $X_{F2}$.

The center of the entire high-density opening region $S_H$ in this embodiment is the geometric center G as in the embodiments shown in FIGS. 8, 10, 11, and 12. Further, the position of the geometric center G of the high-density opening region $S_H$ in the leading-edge-to-trailing-edge direction is located on the suction surface 38 side, and the position of the geometric center G of the high-density opening region $S_H$ in the blade height direction is located on the outer side of the midpoint of the airfoil portion in the blade height direction.

According to the embodiment shown in FIG. 13, as in some embodiments, the high-density opening region $S_H$ is formed at the position corresponding to the blade surface where separation of the coating is likely to occur so that the opening density of the impingement cooling holes 60 in this region is higher than in the other regions. Thus, the cooling of the airfoil portion 42 is enhanced, and thermal damage is suppressed. Further, since the opening density of the leading edge high-density opening region $S_{H1}$ in the leading edge region 33 is higher than the opening density of the other regions including the trailing edge high-density opening region $S_{H2}$, it is possible to further suppress thermal damage to the leading edge region 33 of the airfoil portion 42, compared with some of other embodiments. On the other hand, although the opening density of the trailing edge high-density opening region $S_{H2}$ is lower than the opening density of the leading edge high-density opening region $S_{H1}$, the impingement cooling effect of the trailing edge high-density opening region $S_{H2}$ and the film cooling effect of the second film cooling holes 55 act cumulatively, so that thermal damage to the blade surface at a position closer to the trailing edge 34 than the second film cooling holes 55 is suppressed.

Further, the region included in the leading edge region 33 of the blade surface and located on the outer side in the blade height direction in the leading edge region 33, particularly, on the outer side of the midpoint in the blade height direction, includes the outer leading edge high-density opening region $S_{H11}$, where the opening density is the highest among regions on the suction-side blade surface. Thus, cooling enhancement in the outer region with respect to the blade height direction in the leading edge region 33, where separation of the coating is likely to occur and a high heat load is applied, is achieved. Further, the inner leading edge high-density opening region $S_{H12}$ extending on the inner side of the outer leading edge high-density opening region $S_{H11}$ in the blade height direction has a lower opening density than the outer leading edge high-density opening region $S_{H11}$ but has a higher opening density than the trailing edge high-density opening region $S_{H2}$. Thus, the cooling of the region CHFE on the inner side in the leading edge region 33 of the airfoil portion 42 in the blade height direction, which has a high heat transfer rate and tends to be heated, is enhanced.

The cooling structure combining film cooling and impingement cooling in this embodiment differs from the embodiment shown in FIG. 11 in that the first film cooling holes 53 are not provided, and the opening density of the outer leading edge high-density opening region $S_{H11}$ is lower. In the embodiment shown in FIG. 13, like the embodiment shown in FIG. 12, in the case where the coating merely slightly separates from the blade surface of the turbine blade, even if the impingement cooling effect in the outer region with respect to the blade height direction in the leading edge region 33 and the film cooling effect by the first film cooling holes 53 are weakened, thermal damage of the airfoil portion 42 can be suppressed.

In the embodiments described above, depending on the position in the leading-edge-to-trailing-edge direction where separation of the coating occurs, the high-density opening region $S_H$ may be disposed closer to the trailing edge 34 than to the leading edge 32 in the leading-edge-to-trailing-edge direction, and the position $X_{F2}$ of the second film cooling holes 55 (second film cooling hole array 54) may be disposed closer to the leading edge 32 than the position $X_{S1}$ of the leading end of the high-density opening region $S_H$ (closer to the leading edge than the position corresponding to the high-density opening region $S_H$). With this arrangement, the film boundary layer of the second film cooling holes 55 covers the entire range of the high-density opening region $S_H$, and the film cooling effect of the second film cooling holes 55 covers the entire range of the high-density opening region $S_H$, so that the cooling of the airfoil portion 42 is enhanced.

In the foregoing, the turbine blade 40 has been described by taking the stator blade 24 as an example, but the turbine blade 40 may be the rotor blade 26.

In the gas turbine 1 (see FIG. 1), the turbine blade 40 may be the stator blade 24 or the rotor blade 26 positioned downstream of the first-stage rotor blades 27, among the multiple stages of the rotor blades 26 and the multiple stages of the stator blades 24 disposed in the combustion gas passage 28. In other words, in the gas turbine shown in FIG. 1, the turbine blade 40 may be the stator blade 24 or the rotor blade 26 at the second and following stages.

According to the finding of the present inventor, the combustion gas discharged from the combustor 4 and particles contained in the combustion gas are provided with a swirl component with rotation of the rotor blade and are likely to flow on the radially outer side of the combustion gas passage. As a result, separation of the thermal barrier coating may occur on the blade surface of the stator blade 24 near the outer shroud 44 or the blade surface of the rotor blade 26 on the tip side.

In addition, in the case where the stator blade 24 or the rotor blade 26 positioned downstream of the first-stage rotor blades 27 has the above-described configuration of the turbine blade 40, particles in the combustion gas are more likely to flow on the radially outer side in the combustion gas passage. As a result, also in the stator blade 24 (turbine blade 40) or the rotor blade 26 (turbine blade 40) downstream of the first-stage rotor blades 27, separation of the thermal barrier coating is likely to occur on the blade surface of the stator blade 24 near the outer shroud 44 or the blade surface of the rotor blade 26 on the tip side. Therefore, by providing the high-density opening region $S_H$ of the insert 70 at a position corresponding to the position of such blade surfaces, it is possible to effectively suppress thermal damage to the airfoil portion 42.

Embodiments of the present invention were described in detail above, but the present invention is not limited thereto, and various amendments and modifications may be implemented.

For instance, although above embodiments were described in conjunction with the case where the high-density opening region $S_H$ of the impingement cooling holes 60 is formed on the surface 74 of the insert 70 corresponding to the suction surface 38 of the airfoil portion 42, in some embodiments, the high-density opening region $S_H$ of the impingement cooling holes 60 may be formed on the surface 72 of the insert 70 corresponding to the pressure surface 36 of the airfoil portion 42. In this case, it is possible to effectively suppress thermal damage on the pressure surface 36 side of the airfoil portion 42.

Further, in the present specification, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same" "equal" and "uniform" shall not be construed as indicating only the state in which the feature is strictly equal, but also includes a state in which there is a tolerance or a difference that can still achieve the same function.

Further, for instance, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as "comprise", "include", "have" are not intended to be exclusive of other components.

REFERENCE SIGNS LIST

1 Gas turbine
2 Compressor
4 Combustor
6 Turbine
8 Rotor
10 Compressor casing
12 Air inlet
16 Stator blade
18 Rotor blade
20 Casing
22 Turbine casing
24 Stator blade
25 First-stage stator blade
26 Rotor blade
27 First-stage rotor blade
28 Combustion gas passage
30 Exhaust chamber
32 Leading edge
33 Leading edge region
33a Pressure-side end
33b Suction-side end
34 Trailing edge
36 Pressure surface
38 Suction surface
40 Turbine blade
42 Airfoil portion
42A Inner wall surface
42B Outer wall surface
43 Hollow portion
43a Forward hollow portion
43b After hollow portion
44 Outer shroud
46 Inner shroud
47 Main cavity
48 Intermediate cavity
50 Film cooling holes
52 First film cooling hole array
53 First film cooling hole
53 Second film cooling hole array
54 Second film cooling hole
55 Third film cooling hole array
56 Third film cooling hole
58 Pin fin
60 Impingement cooling hole
62 Partition wall
64 Rib
70 Insert
70a Forward insert
70b After insert
72 Surface
72a Surface
72b Surface
74 Surface
74a Surface
74b Surface
82 Outer end
84 Inner end
$S_H$ High-density opening region (First high-density opening region)
$S_{H1}$ Leading edge high-density opening region (Second high-density opening region)
$S_{H2}$ Trailing edge high-density opening region (Third high-density opening region)
$S_{H11}$ Outer leading edge high-density opening region (Fourth high-density opening region)
$S_{H12}$ Inner leading edge high-density opening region (Fifth high-density opening region)

The invention claimed is:

1. A turbine blade comprising:
an airfoil portion having a hollow portion extending along a blade height direction and a plurality of film cooling holes arranged along the blade height direction, the airfoil portion having an outer end on an outer side in the blade height direction; and
an insert disposed in the hollow portion along the blade height direction and having a plurality of impingement cooling holes,
wherein the insert includes a first high-density opening region disposed in a portion of the insert extending in the blade height direction and along an inner wall of the airfoil portion, the first high-density opening region having a higher density of the impingement cooling holes than in other surface regions of the insert, the first high-density opening region having an outer end on an outer side in the blade height direction, wherein the outer end of the first high-density opening region extends in a leading-edge-to-trailing-edge direction and along the outer end of the airfoil portion, wherein a geometric center of the first high-density opening region is positioned on a suction side of the airfoil portion in the leading-edge-to-trailing-edge direction, wherein the geometric center of the first high-density opening region is positioned on an outer side of a midpoint of the airfoil portion in the blade height direction, wherein the plurality of film cooling holes forms a plurality of film cooling hole arrays disposed in a suction surface of the airfoil portion, each of the plurality of film cooling hole arrays extending in the blade height direction, the plurality of film cooling hole arrays being spaced from each other in the leading-edge-to-trailing-edge direction, and wherein a first film cooling hole array of the plurality of film cooling hole arrays is disposed at a first chordwise position, a trailing end of the first high-density opening region is disposed at a second chordwise position, and a second film cooling hole array of the plurality of film cooling hole arrays is disposed at a third chordwise position, wherein chordwise positions are defined starting from zero at the leading edge and increase toward the trailing edge, wherein the first chordwise position is greater than the second chordwise position, and the third chordwise position is less than the second chordwise position, wherein the first high-density opening region includes:
 a second high-density opening region formed on a leading edge side with respect to the airfoil portion; and
 a third high-density opening region formed on a more trailing edge side with respect to the airfoil portion than the second high-density opening region, wherein an opening density of the second high-density opening region is higher than an opening density of the third high-density opening region, wherein an inner end of the second high-density opening region is disposed on an inner side relative to a middle position of the airfoil portion in the blade height direction, and wherein an inner end of the third high-density opening region is disposed on an outer side relative to the middle position of the airfoil portion in the blade height direction.

2. The turbine blade according to claim 1, wherein the plurality of film cooling hole arrays is formed over a blade height range including at least the first high-density opening region.

3. The turbine blade according to claim 2, wherein the geometric center of the first high-density opening region is positioned between the plurality of film cooling hole arrays in the leading-edge-to-trailing-edge direction.

4. The turbine blade according to claim 1, wherein a range in which the second high-density opening region extends in the blade height direction of the airfoil portion is larger than a range in which the third high-density opening region extends in the blade height direction of the airfoil portion.

5. The turbine blade according to claim 1,
wherein the second high-density opening region includes:
 a fourth high-density opening region formed on an outer side in the blade height direction of the airfoil portion; and
 a fifth high-density opening region formed on an inner side in the blade height direction, and
wherein an opening density of the fourth high-density opening region is higher than an opening density of the fifth high-density opening region.

6. The turbine blade according to claim 5, wherein the opening density of the fifth high-density opening region is higher than the opening density of the third high-density opening region.

7. The turbine blade according to claim 1, wherein the plurality of film cooling hole arrays are disposed between the second high-density opening region and the third high-density opening region in the leading-edge-to-trailing-edge direction.

8. The turbine blade according to claim 1,
wherein the plurality of film cooling hole arrays includes a third film cooling hole array disposed at a fourth chordwise position, and
wherein the fourth chordwise position is greater than the third chordwise position and less than the second chordwise position.

9. The turbine blade according to claim 8, wherein the third film cooling hole array is formed over a blade height range including at least the first high-density opening region.

10. The turbine blade according to claim 8, wherein the second film cooling hole array is formed over a blade height range including the third film cooling hole array.

11. The turbine blade according to claim 8,
wherein, on the suction surface of the airfoil portion, a distance $L_{12}$ satisfies $0.3L_{23} \leq L_{12} \leq 0.5L_{23}$, where $L_{23}$ is a distance between the second film cooling hole array and the first film cooling hole array, and Liz is a distance between the third film cooling hole array and the second film cooling hole array.

12. The turbine blade according to claim 8,
wherein, on the suction surface of the airfoil portion, a distance $L_1^*$ satisfies $0.3L^* \leq L_1^* \leq 0.7L^*$, where $L^*$ is a distance between a leading end and a trailing end of the first high-density opening region, and $L_1^*$ is a distance between the leading end of the first high-density opening region and the third film cooling hole array.

13. The turbine blade according to claim 1, further comprising a rib formed on an inner wall surface of the hollow portion and extending from a leading edge side to a trailing edge side of the airfoil portion,
wherein the impingement cooling holes are offset from the rib in the blade height direction.

14. The turbine blade according to claim 1, further comprising a thermal barrier coating disposed so as to cover a surface of the airfoil portion.

15. The turbine blade according to claim 1,
wherein the turbine blade is a gas turbine stator blade.

16. A gas turbine comprising:
the turbine blade according to claim 1; and
a combustor for producing a combustion gas flowing through a combustion gas passage in which the turbine blade is disposed.

17. The turbine blade according to claim 1,
wherein the first high-density opening region has a leading end on a leading edge side and a trailing end on a trailing edge side, the leading end and the trailing end defining a range of the first high-density opening region in the leading-edge-to-trailing-edge direction, wherein the leading end is disposed closer to the leading edge of the airfoil portion than the plurality of film cooling hole arrays, and wherein the trailing end is disposed between the plurality of film cooling hole arrays.

* * * * *